(12) United States Patent
Teggatz et al.

(10) Patent No.: US 10,673,489 B2
(45) Date of Patent: Jun. 2, 2020

(54) ISOLATION FOR COMMUNICATION AND POWER

(71) Applicant: Triune IP LLC, Plano, TX (US)

(72) Inventors: Ross E. Teggatz, Plano, TX (US); Eric Blackall, Plano, TX (US); Wayne T. Chen, Plano, TX (US)

(73) Assignee: TRIUNE IP LLC, Plano, TX (US)

( * ) Notice: Subject to any disclaimer, the term of this patent is extended or adjusted under 35 U.S.C. 154(b) by 0 days.

(21) Appl. No.: 16/113,077

(22) Filed: Aug. 27, 2018

(65) Prior Publication Data

US 2019/0013840 A1 Jan. 10, 2019

Related U.S. Application Data

(63) Continuation of application No. 14/638,701, filed on Mar. 4, 2015, now Pat. No. 10,063,284.
(Continued)

(51) Int. Cl.
*H01F 38/00* (2006.01)
*H04B 5/00* (2006.01)
(Continued)

(52) U.S. Cl.
CPC ............ *H04B 5/0037* (2013.01); *H02J 50/05* (2016.02); *H02J 50/12* (2016.02); *H02J 50/30* (2016.02);
(Continued)

(58) Field of Classification Search
CPC .. H02J 50/80; H02J 50/05; H02J 50/12; H02J 50/30; H02J 50/40; H04B 5/0037; H04B 5/0031; H04B 5/005
(Continued)

(56) References Cited

U.S. PATENT DOCUMENTS

| 5,583,421 A | * | 12/1996 | Barbehenn | ............ H02M 3/005 323/222 |
| 6,396,250 B1 | * | 5/2002 | Bridge | ................ H02M 3/1588 323/283 |

(Continued)

FOREIGN PATENT DOCUMENTS

| EP | 2502344 | 9/2012 |
| JP | 2012019675 A | 1/2012 |

(Continued)

*Primary Examiner* — Ryan Jager
(74) *Attorney, Agent, or Firm* — Jackson Walker LLP; Christopher J. Rourk

(57) ABSTRACT

A system configured to provide galvanic isolation of data or power signals between primary and secondary sides. In various forms, the system may provide galvanic isolation with primary side passive or active sensing of a secondary side load, and with secondary side control for dual data and power control over a single galvanic interface; with series capacitive, series capacitive and resistive, alternating series capacitive and resistive, or series and parallel capacitive galvanic isolation, or series and parallel capacitive galvanic isolation for multiple isolated ground planes; using Manchester encoding across the galvanic isolation region; using differential power and data across the galvanic isolation region; using an isolated common reference for data and power links across the galvanic isolation region; using controller area networking across the galvanic isolation region; or using a resonant configuration and having feedback between the galvanic interface, only on the primary side, or only on the secondary side.

18 Claims, 25 Drawing Sheets

Related U.S. Application Data

(60) Provisional application No. 61/947,840, filed on Mar. 4, 2014.

(51) Int. Cl.
*H02J 50/80* (2016.01)
*H02J 50/30* (2016.01)
*H02J 50/40* (2016.01)
*H02J 50/12* (2016.01)
*H02J 50/05* (2016.01)

(52) U.S. Cl.
CPC .............. *H02J 50/40* (2016.02); *H02J 50/80* (2016.02); *H04B 5/005* (2013.01); *H04B 5/0031* (2013.01)

(58) Field of Classification Search
USPC ........................................................ 307/104
See application file for complete search history.

(56) References Cited

U.S. PATENT DOCUMENTS

| | | | |
|---|---|---|---|
| 6,462,962 B1* | 10/2002 | Cuk | H02M 1/34 363/131 |
| 6,650,554 B2* | 11/2003 | Darshan | H02H 9/001 323/207 |
| 7,023,183 B1* | 4/2006 | Keller | H02M 1/32 323/222 |
| 7,626,370 B1* | 12/2009 | Mei | H02M 3/1563 323/222 |
| 7,808,127 B2 | 10/2010 | Teggatz et al. | |
| 7,827,334 B2 | 11/2010 | Teggatz et al. | |
| 7,859,911 B2 | 12/2010 | Teggatz et al. | |
| 8,102,713 B2 | 1/2012 | Teggatz et al. | |
| 8,408,900 B2 | 4/2013 | Teggatz et al. | |
| 8,552,336 B2 | 10/2013 | Blackall et al. | |
| 8,583,037 B2 | 11/2013 | Atrash et al. | |
| 8,584,961 B2 | 11/2013 | Teggatz et al. | |
| 8,664,745 B2 | 3/2014 | Teggatz et al. | |
| 8,687,385 B2 | 4/2014 | Teggatz et al. | |
| 8,704,450 B2 | 4/2014 | Chen et al. | |
| 8,743,522 B2 | 6/2014 | Terratz et al. | |
| 8,768,455 B2 | 7/2014 | Teggatz et al. | |
| 8,964,418 B2 | 2/2015 | Atrash et al. | |
| 9,083,391 B2 | 7/2015 | Teggatz et al. | |
| 9,106,221 B2 | 8/2015 | Atrash et al. | |
| 9,214,867 B2 | 12/2015 | Teggatz et al. | |
| 9,225,199 B2 | 12/2015 | Teggatz et al. | |
| 9,225,293 B2 | 12/2015 | Teggatz et al. | |
| 9,231,400 B2 | 1/2016 | Chen et al. | |
| 9,354,268 B2 | 5/2016 | Teggatz et al. | |
| 9,444,517 B2 | 9/2016 | Teggatz et al. | |
| 9,515,560 B1* | 12/2016 | Telefus | H02M 3/158 |
| 9,515,651 B2 | 12/2016 | Teggatz et al. | |
| 9,530,555 B2 | 12/2016 | Teggatz et al. | |
| 9,553,457 B2 | 1/2017 | Teggatz et al. | |
| 9,559,585 B2 | 1/2017 | Teggatz et al. | |
| 9,599,660 B2 | 3/2017 | Teggatz et al. | |
| 9,602,167 B2 | 3/2017 | Teggatz et al. | |
| 9,653,944 B2 | 5/2017 | Teggatz et al. | |
| 9,740,224 B2 | 8/2017 | Atrash et al. | |
| 9,787,364 B2 | 10/2017 | Moore et al. | |
| 9,906,018 B2 | 2/2018 | Teggatz et al. | |
| 9,954,448 B2 | 4/2018 | Teggatz et al. | |
| 10,027,233 B2* | 7/2018 | Somarowthu | H02M 1/08 |
| 10,063,284 B2 | 8/2018 | Teggatz et al. | |
| 10,079,090 B2 | 9/2018 | Teggatz et al. | |
| 10,096,995 B2 | 10/2018 | Teggatz et al. | |
| 10,186,897 B2 | 1/2019 | Teggatz et al. | |
| 10,203,707 B2 | 2/2019 | Teggatz et al. | |
| 10,250,081 B2 | 4/2019 | Teggatz et al. | |
| 2009/0314677 A1 | 12/2009 | Teggatz et al. | |
| 2010/0230784 A1 | 9/2010 | Teggatz et al. | |
| 2010/0292671 A1 | 11/2010 | Allgood et al. | |
| 2011/0006742 A1 | 1/2011 | Teggatz et al. | |
| 2011/0008527 A1 | 1/2011 | Teggatz et al. | |
| 2011/0205763 A1* | 8/2011 | Artusi | H02M 1/4225 363/21.06 |
| 2011/0227525 A1 | 9/2011 | Blackall et al. | |
| 2011/0241445 A1 | 10/2011 | Teggatz et al. | |
| 2012/0025752 A1 | 2/2012 | Teggatz et al. | |
| 2012/0028845 A1 | 2/2012 | Teggatz et al. | |
| 2012/0044717 A1* | 2/2012 | Suntio | H02M 3/33523 363/17 |
| 2012/0104999 A1 | 5/2012 | Teggatz et al. | |
| 2012/0139358 A1 | 6/2012 | Teggatz et al. | |
| 2012/0176822 A1* | 7/2012 | Menegoli | H02M 3/156 363/21.18 |
| 2012/0187772 A1 | 7/2012 | Teggatz et al. | |
| 2012/0188673 A1 | 7/2012 | Teggatz et al. | |
| 2012/0220101 A1 | 8/2012 | Teggatz et al. | |
| 2012/0235601 A1 | 9/2012 | Teggatz et al. | |
| 2012/0242164 A1 | 9/2012 | Teggatz et al. | |
| 2012/0248893 A1 | 10/2012 | Teggatz et al. | |
| 2012/0274838 A1 | 11/2012 | Teggatz et al. | |
| 2012/0306612 A1 | 12/2012 | Teggatz et al. | |
| 2013/0015805 A1 | 1/2013 | Teggatz et al. | |
| 2013/0033903 A1 | 2/2013 | Teggatz et al. | |
| 2013/0062967 A1 | 3/2013 | Teggatz et al. | |
| 2013/0175982 A1 | 7/2013 | Teggatz et al. | |
| 2013/0181724 A1 | 7/2013 | Teggatz et al. | |
| 2013/0193771 A1 | 8/2013 | Teggatz | |
| 2013/0257171 A1 | 10/2013 | Teggatz et al. | |
| 2014/0225447 A1 | 8/2014 | Teggatz | |
| 2014/0301262 A1* | 10/2014 | Homchaudhuri | H04W 52/0235 370/311 |
| 2014/0329720 A1 | 11/2014 | Teggatz et al. | |
| 2015/0098252 A1* | 4/2015 | Spinella | H02M 3/005 363/21.01 |
| 2016/0315545 A1* | 10/2016 | Kovacevic | H02M 3/33523 |
| 2016/0322910 A1* | 11/2016 | Kovacevic | H02M 3/33576 |
| 2016/0365795 A1* | 12/2016 | Madsen | H02M 3/158 |
| 2017/0005526 A1 | 1/2017 | Teggatz et al. | |
| 2017/0085189 A1* | 3/2017 | Madsen | H02M 3/33546 |
| 2017/0125161 A1 | 5/2017 | Teggatz et al. | |
| 2017/0255212 A1 | 9/2017 | Teggatz et al. | |
| 2018/0034506 A1 | 2/2018 | Moore et al. | |
| 2019/0171239 A1 | 6/2019 | Teggatz et al. | |

FOREIGN PATENT DOCUMENTS

| | | |
|---|---|---|
| WO | 2011/056902 | 5/2011 |
| WO | 2011/057023 | 5/2011 |
| WO | 2011/057031 | 5/2011 |
| WO | 2016/019139 | 2/2016 |

* cited by examiner

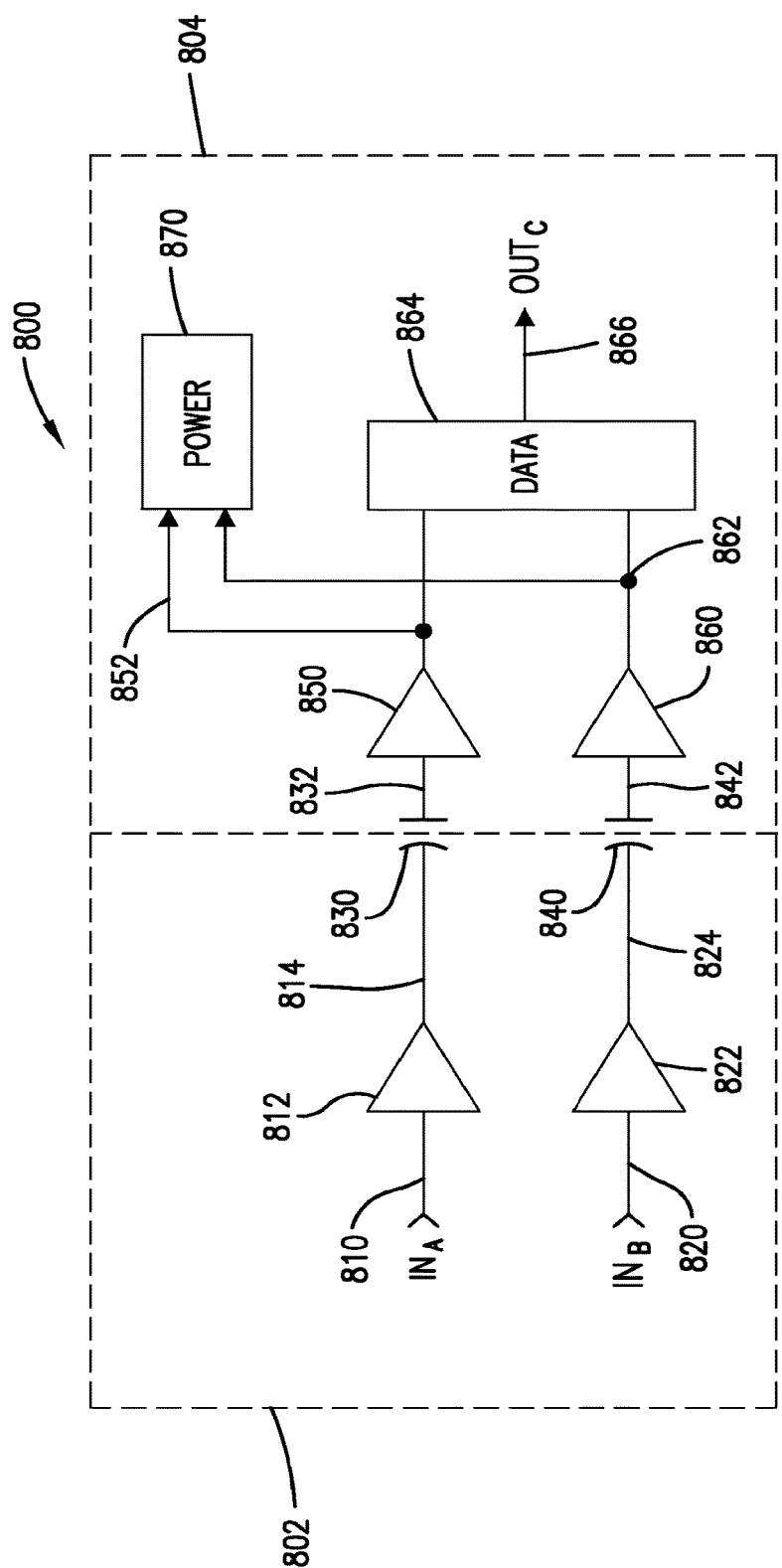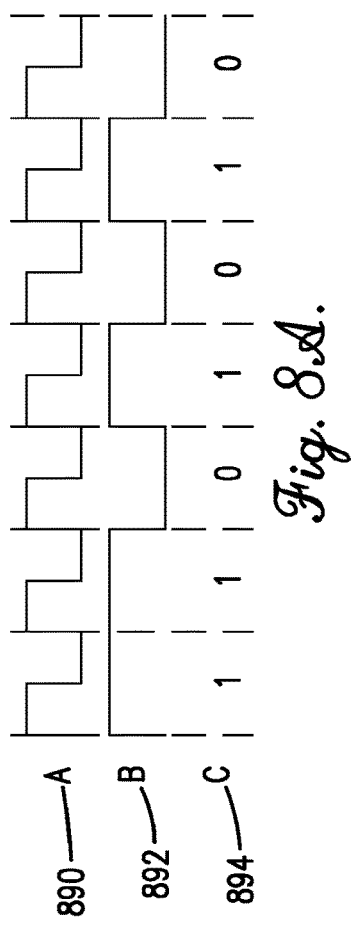
Fig. 8A.

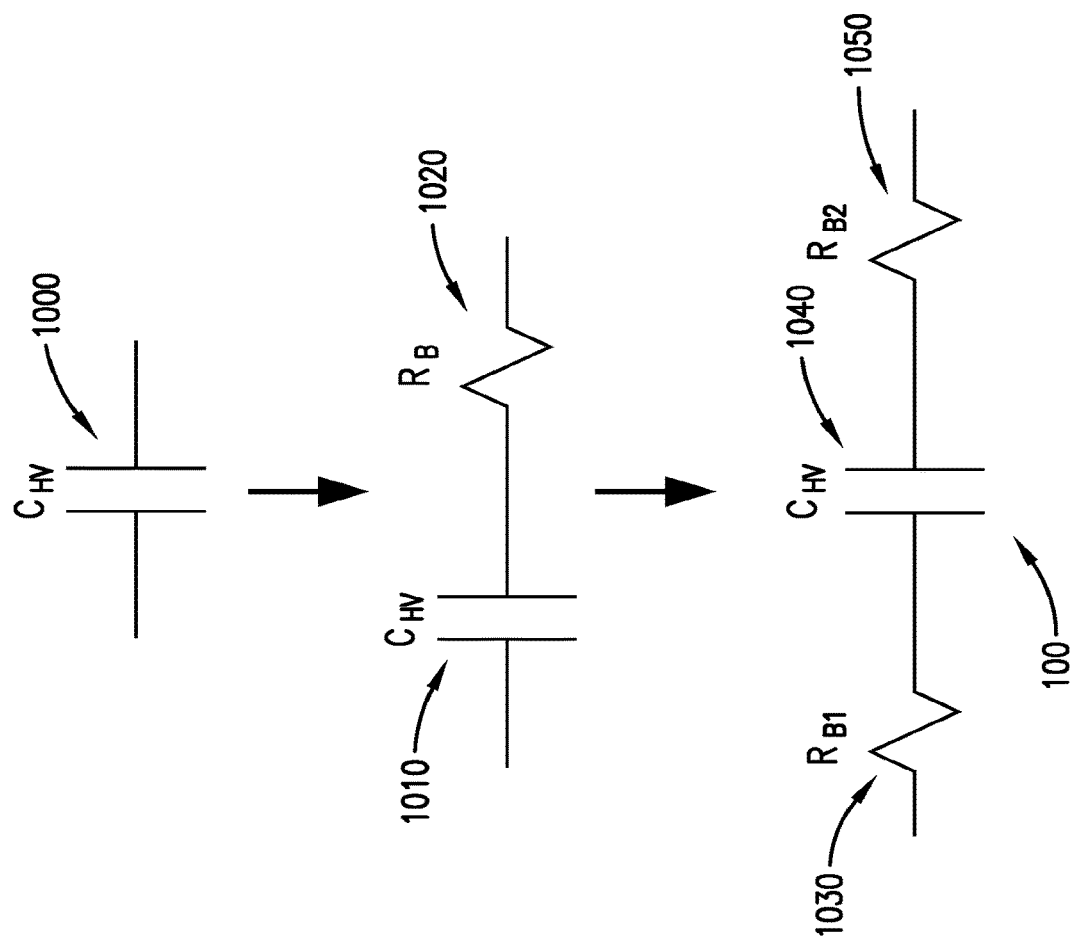

ISOLATION FOR COMMUNICATION AND POWER

RELATED APPLICATIONS

The present U.S. non-provisional patent application is a continuation of U.S. patent application Ser. No. 14/638,701, filed Mar. 4, 2015 now U.S. Pat. No. 10,063,284, which claims priority benefit, with regard to all common subject matter, of an earlier filed U.S. provisional patent application of the same title, Ser. No. 61/947,840, filed Mar. 4, 2014. The content of the earlier filed application is hereby incorporated by reference into the present application.

FIELD

The present invention relates to systems and methods for galvanic isolation of data and power signals.

BACKGROUND

Isolated power and data transfer can be accomplished using a variety of coupling methods. One coupling method employs magnetic isolation and coupling magnetic field energy from one inductor to another inductor. Another coupling method involves driving a capacitor across an isolated region. However, this can create significant challenges. One challenge is ensuring that the capacitor does not exceed its dielectric breakdown, which can be especially difficult when integrating high voltage capacitors for isolation. Another challenge is difficulty in monitoring data and/or power from one isolated side to another. It is possible to use additional isolated interfaces, but that adds undesirable cost and complexity to the system.

SUMMARY

The present invention overcomes the above-described problems and limitations by providing a system configured to provide galvanic isolation of data or power signals between primary and secondary sides. In various forms, the system may provide galvanic isolation with primary side passive or active sensing of a secondary side load, and with secondary side control for dual data and power control over a single galvanic interface; with series capacitive, series capacitive and resistive, alternating series capacitive and resistive, or series and parallel capacitive galvanic isolation, or series and parallel capacitive galvanic isolation for multiple isolated ground planes; using Manchester encoding across the galvanic isolation region; using differential power and data across the galvanic isolation region; using an isolated common reference for data and power links across the galvanic isolation region; using controller area networking across the galvanic isolation region; or using a resonant configuration and having feedback between the galvanic interface, only on the primary side, or only on the secondary side.

In one embodiment, the system may comprise a primary side, a secondary side, and a galvanic isolation component connecting the primary and secondary sides. The primary side may include a first component providing a data or power waveform, a sensing device connected to an output of the first component, and a second component connected to an output of the sensing device. The secondary side may include a load having a changing impedance value. The galvanic isolation component connects the primary side to the secondary side in such a manner that electric current does not flow between the primary side and the secondary side. The sensing device may produce a first output waveform if the changing impedance value of the load is high and a second output waveform if the changing impedance of the load is low.

In various alternative implementations of this embodiment, the system may further include any one or more of the following features. The sensing device may be selected from the group consisting of: passive devices, active devices, resistors, and current sources. The galvanic isolation component may be selected from the group consisting of: capacitors, magnetic coupling devices, inductors, transformers, and optical coupling devices. There may be two or more galvanic isolation components connected in series. There may be two or more galvanic isolation components, with each galvanic isolation component independently connecting the primary side to the secondary side. The first component may be a first driver, and the second component may be a second driver. The first component may be an output pin of a control device, and the second component may be an input pin of the control device.

In another embodiment, the system may comprise a primary side, a secondary side, and a galvanic isolation component connecting the primary and secondary sides. The primary side may include a primary side first driver receiving a primary side input data or power waveform, and a primary side second driver connected to an output of the primary side first driver and providing a primary side output data or power waveform. The secondary side may include a secondary side first driver receiving a secondary side input data or power waveform, and a secondary side second driver connected to an output of the secondary side first driver and providing a secondary side output data or power waveform. The galvanic isolation component connects the primary side to the secondary side in such a manner that electric current does not flow between the primary side and the secondary side.

In various alternative implementations of this embodiment, the system may further include any one or more of the following features. The galvanic isolation component may be selected from the group consisting of: capacitors, magnetic coupling devices, inductors, transformers, and optical coupling devices. There may be two or more galvanic isolation components connected in series, and, additionally, the system may further include a first galvanic resistor connected in series with a first galvanic isolation component, and a second galvanic resistor connected in series with a second galvanic isolation component, wherein the first and second galvanic resistors are configured to provide voltage balancing for the first and second galvanic isolation components and allow for greater galvanic isolation. There may be two or more galvanic isolation components, with each galvanic isolation component independently connecting the primary side to the secondary side. The system may further include a tertiary side, and the tertiary side may include a tertiary side first driver receiving a tertiary side input data or power waveform, and a tertiary side second driver connected to an output of the tertiary side first driver and providing a tertiary side output data or power waveform. If the system includes a tertiary side, then there may be a plurality of galvanic isolation components including a first galvanic isolation component connected to an output of the primary side first driver and an input of the primary side second driver, a second galvanic isolation component connected to an output of the secondary side first driver and an input of the secondary side second driver, and a third galvanic isolation component connected to an output of the tertiary side first driver and to an input of the tertiary side second driver, wherein the first, second, and third galvanic isolation components connect the primary, secondary, and tertiary sides in such a manner that electric current does not flow between the primary, secondary, and tertiary sides.

In another embodiment, the system may comprise a primary side, a secondary side, and first and second galvanic isolation components connecting the primary and secondary sides. The primary side may include a primary side first driver receiving a primary side first input data or power waveform, and a primary side second driver receiving a primary side second input data or power waveform. The secondary side may include a secondary side data block providing a secondary side output data or power waveform, a secondary side power block, a secondary side first driver having an output connected to the data block and the power block, and a secondary side second driver having an output connected to the data block and the power block. The first galvanic isolation component connects an output of the primary side first driver to an input of the secondary side first driver in such a manner that electric current does not flow between the primary side and the secondary side. The second galvanic isolation component connects an output of the primary side second driver to an input of the secondary side second driver in such a manner that electric current does not flow between the primary side and the secondary side.

In various alternative implementations of this embodiment, the system may further include any one or more of the following features. The galvanic isolation component may be selected from the group consisting of: capacitors, magnetic coupling devices, inductors, transformers, and optical coupling devices. Each of the first and second galvanic isolation components may include two or more galvanic isolation components connected in series. The output data or power waveform may be encoded with Manchester code. The primary side may further include a primary side data block and a primary side power block so as to allow for bidirectional transfer of a data or power waveform In another embodiment, the system may comprise a primary side, a secondary side, and a galvanic isolation component connecting the primary and secondary sides. The primary side may include a control block providing a control block output signal, a primary side inductor connected to a voltage reference, and a primary side field effect transistor (FET) having a gate, the gate being connected to the control block and receiving the control block output signal, the primary side FET being further connected to the primary side inductor and to a ground reference. The secondary side may include a secondary side storage element, and a feedback block receiving a feedback block input signal and providing a feedback block output signal. The galvanic isolation component connects the primary side to the secondary side in such a manner that electric current does not flow through the galvanic isolation component between the primary side and the secondary side.

In various alternative implementations of this embodiment, the system may further include any one or more of the following features. The galvanic isolation component may be selected from the group consisting of: capacitors, magnetic coupling devices, inductors, transformers, and optical coupling devices. There may be two or more galvanic isolation components connected in series. There may be two or more galvanic isolation components, with each galvanic isolation component independently connecting the primary side to the secondary side. The feedback block may be connected between the secondary side storage element which provides the feedback block input signal and the control block which receives the feedback block output signal. The feedback block may be connected between a point on the primary side which provides the feedback block input signal and the control block which receives the feedback block output signal. The feedback block may be connected between the secondary side storage element which provides the feedback block input signal and a point on the secondary side which receives the feedback block output signal.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 8A is a diagram of another embodiment of the system configured to provide galvanic isolation of data and power with capacitive galvanic isolation using Manchester encoding and decoding across the galvanic isolation region;

FIG. 10 is a diagram of an embodiment of a capacitive galvanic isolation component which can be realized with a plurality of combinations of resistive and capacitive components;

Figure 1:
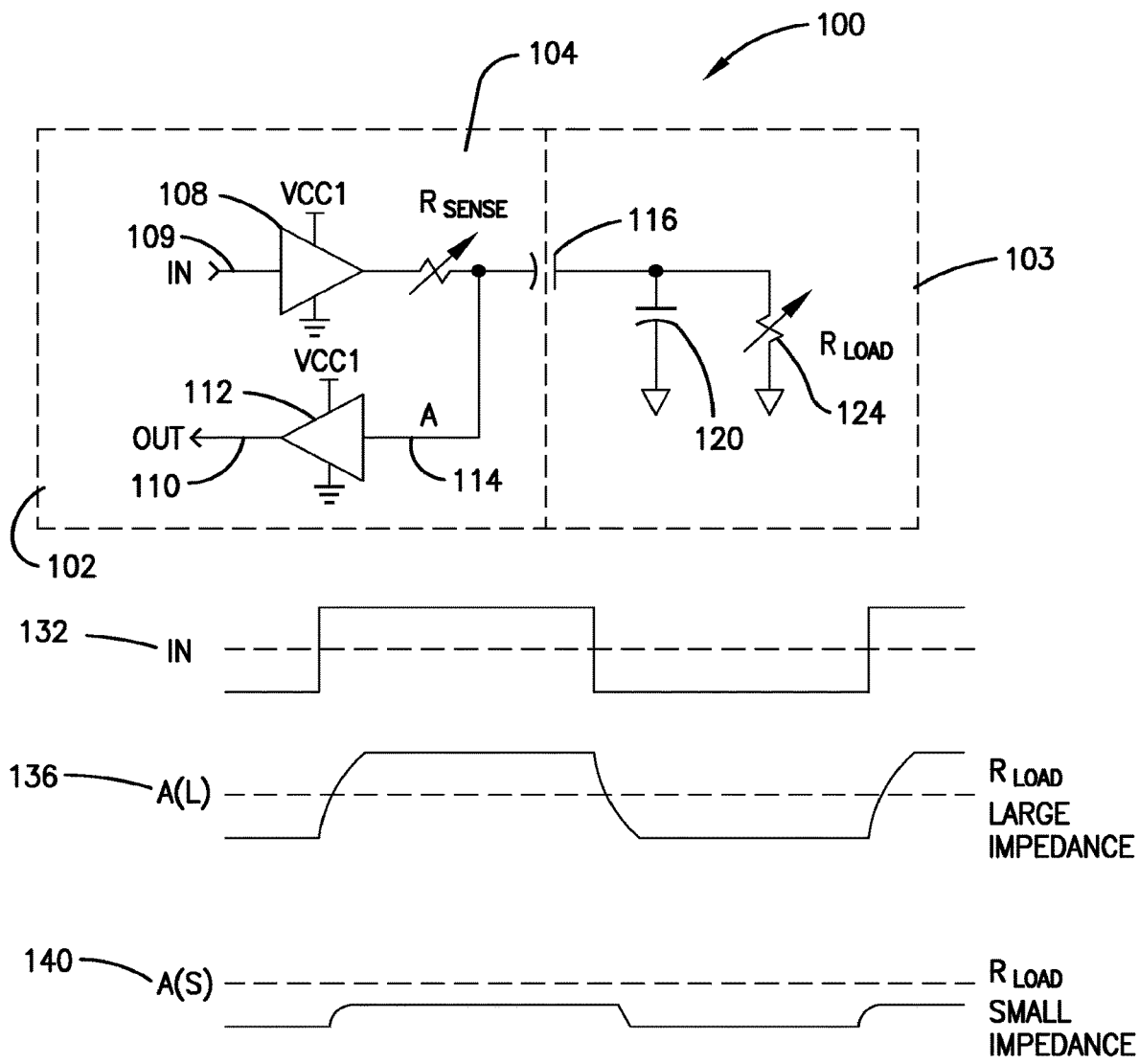
FIG. 1 is a diagram of an embodiment of a system configured to provide galvanic isolation of data or power with primary passive component sensing of a secondary load.

The drawing figures may not be to scale and certain components may be shown in generalized or schematic form and identified by commercial designations in the interest of clarity and conciseness.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly, the present invention is a system configured to provide galvanic isolation of data or power signals between primary and secondary sides. In various forms, the system may provide galvanic isolation with primary side passive or active sensing of a secondary side load, and with secondary side control for dual data and power control over a single galvanic interface; with series capacitive, series capacitive and resistive, alternating series capacitive and resistive, or series and parallel capacitive galvanic isolation, or series and parallel capacitive galvanic isolation for multiple isolated ground planes; using Manchester encoding across the galvanic isolation region; using differential power and data across the galvanic isolation region; using an isolated common reference for data and power links across the galvanic isolation region; using controller area networking across the galvanic isolation region; or using a resonant configuration and having feedback between the galvanic interface, only on the primary side, or only on the secondary side.

In all of the embodiments of the system shown in the FIGURES and described herein, each galvanic isolation capacitor can be replaced with a magnetic coupling device, such as an inductor or transformer, or an optical coupling device.

In accordance with an embodiment of the present invention, FIG. 1 is a diagram of a system 100 configured to provide galvanic isolation of data or power signals with primary side passive component sensing of a secondary side load. The system 100 includes a primary side 102 and secondary side 103. On the primary side 102, an input node 109 is connected to a primary side data or power driver 108. The primary side data or power driver 108 is connected to a passive sensing device 104. The passive sensing device 104 is connected to a primary side data or power receiver 112 and a galvanic isolation component 116. The galvanic isolation component 116 is connected between the primary side 102 and secondary side 103, and connects the primary and secondary sides 102, 103 in such a manner that current does not flow through the galvanic isolation component 116 between the primary and secondary sides 102, 103. The galvanic isolation component 116 can be created by using any two plates to form a capacitor with a dielectric between the plates that is able to withstand the voltage difference between the primary and secondary sides of the system 100. On the secondary side 103, the galvanic isolation component 116 is connected to secondary side filter capacitor 120 and the secondary side load 124. A primary side data or power driver waveform 132 appears at node 109. If the secondary side load 124 is large, a first primary side data or power data sensing waveform 136 appears at node 114. If the secondary side load 124 is small, a second primary side data or power data sensing waveform 140 appears at node 114.

The primary and secondary sides 102, 103 are galvanically isolated from each other and connected only through the galvanic capacitor 116. In the prior art, if the secondary side load 124 changes from a large impedance to a small impedance, an additional feedback path through an alternative path is required. This adds additional complexity and cost to the isolated system. In the present invention, the passive sensing device 104 is used. The value of the passive sensing device 104 may be static or dynamic. If the secondary side load 124 transitions from large impedance to small impedance, then node 114, which is the output of the passive sensing device 104, is monitored and evaluated by the primary side data or power receiver 112. The primary side data or power receiver 112 may be digital, analog, or analog to digital. For example, if the secondary side load 124 has a large impedance, the output waveform 136 of the passive sensing device 104 is very similar in voltage level to the input waveform 132 of the passive sensing device 104. However, if the secondary side load 124 has a small impedance—such as may result from a shorted load, high load, or normal load operating conduction—the output waveform 140 of the passive sensing device 104 has a much smaller voltage level relative to the input waveform 132. Thus, the primary side voltage level at node 114 can be evaluated to determine the impedance level of the secondary side load 124.

Alternatively, the voltage level at node 114 and the output voltage of the primary side data or power driver 108 can be compared to more precisely determine the impedance of the secondary side load 124. Alternatively, the input voltage to the passive sensing device 104 can be dynamically changed in order to increase the signal change seen at node 114 and even more precisely determine the impedance of the secondary side load 124. Alternatively, the primary sensing device 104 can be replaced with a primary side current source. This current source can be used either statically or dynamically to enhance the evaluation of the impedance of the secondary side load 124. Alternatively, the secondary side load 124 can be replaced with any system load which can consist of any one or more of short, active, passive, active and passive components, or any combination thereof.

Alternatively, the system 100 may include a primary side transceiver system 102 coupled to a secondary side transceiver system 103. The transceiver system may be a power transmission device such as a capacitive plate transformer, a mobile single plate transceiver, a thermostat device, a security device, a cellular telephone, a computing device, a computer peripheral, a meter, a device that utilizes wireless telemetry such as a vending machine, a camera, a portable storage device such as USB drive or external/removable hard drive, a calculator, or other device that has capacitive power transfer capability.

Figure 2:
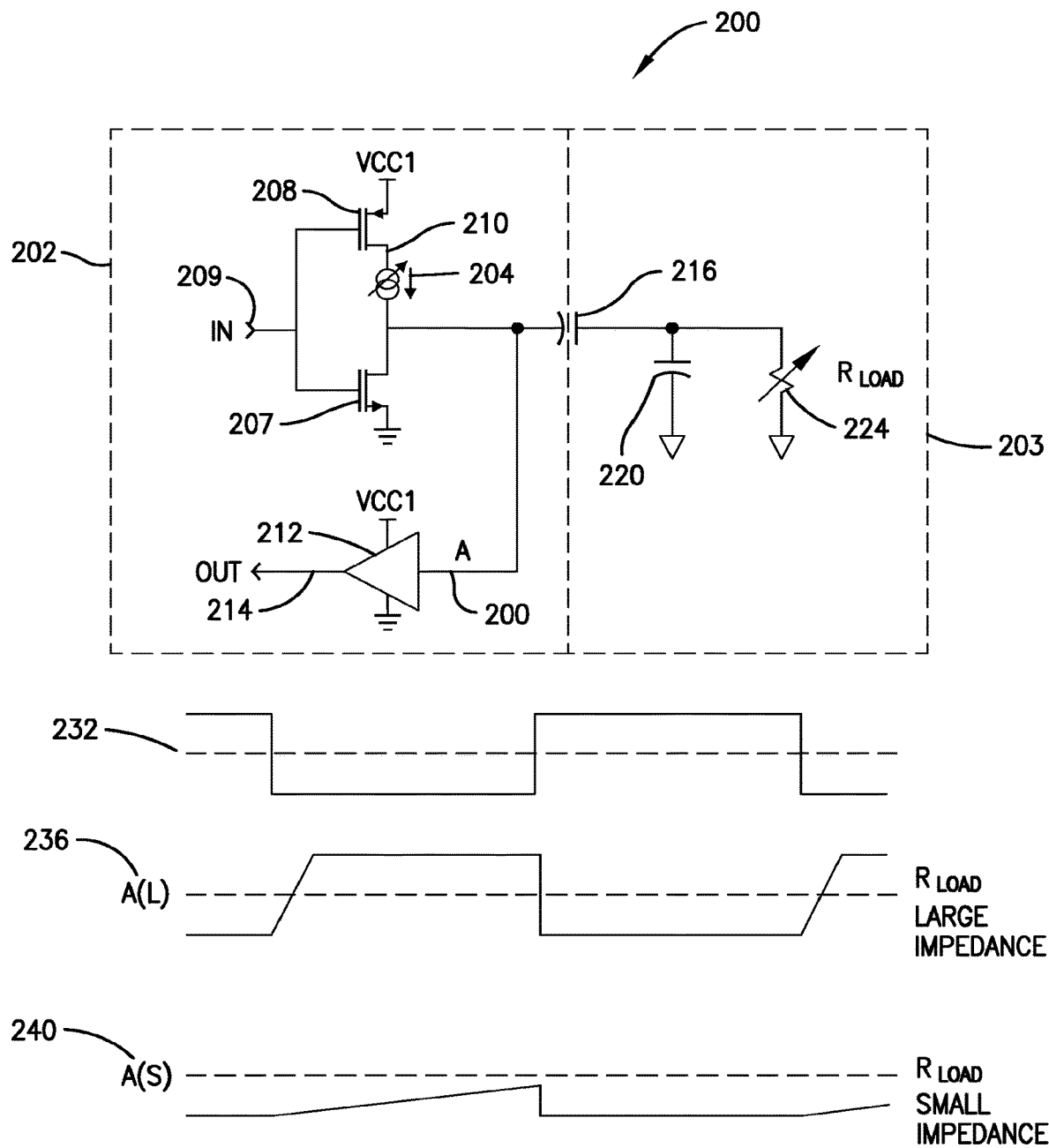
FIG. 2 is a diagram of another embodiment of the system configured to provide galvanic isolation of data or power with primary active component sensing of the secondary load.

In accordance with another embodiment of the present invention, FIG. 2 is a diagram of the system 200 configured to provide galvanic isolation of data or power with primary side active component sensing of the secondary side load. The system 200 includes a primary side 202 and a secondary side 203. On the primary side 202, an input node 209 is connected to a primary side data or power driver high-side FET 208 and low-side FET 207. The primary side data or power driver high-side FET 208 and low-side FET 207 are connected to an active sensing device 204. The active sensing device 204 and the primary data or power low-side FET 207 are connected to a primary side data or power receiver 212 and a galvanic isolation component 216. The galvanic isolation component 216 is connected between the primary side 202 and secondary side 203, and connects the primary and secondary sides 202, 203 in such a manner that current does not flow through the galvanic isolation component 216 between the primary and secondary sides 202, 203. On the secondary side 203, the galvanic isolation component 216 is connected to a secondary side filter capacitor 220 and the secondary side load 224. A primary data or power driver waveform 232 appears at node 210. If the secondary side load 224 is large, a first primary side data or power data sensing waveform 236 appears at node 214. If the secondary side load 224 is small, a second primary side data or power data sensing waveform 240 appears at node 214.

FIG. 2 is similar to FIG. 1, except that the primary side current source 204 is used instead of the resistor 104 as the sensing device. In this embodiment, the primary side current source 204 is placed in series with the primary high side FET 208 which drives node 210 and the low side FET 207 which drives node 200. In using either the primary side resistor 104 or the primary side current source 204, the waveforms 236, 240 associated with a large impedance secondary side load or a small impedance secondary side load both have falling edges that immediately transition from high-level to low-level. Alternatively, the primary side current source 204 could be placed in series with the low side FET 207, in which case the leading edges would immediately transition from low-level to high-level. In either case, the immediate transition on one of the edges provides a quicker reset of the sensing node 200 and allows the driver clock to be increased without filtering the observed node 200. Alternatively additional drivers on the primary side 202 could be placed in parallel and provide more than one driving element to node 200. Alternatively, the primary side current source 204 could be replaced with the primary side resistor 104 in any of the aforementioned implementations.

Figure 3:
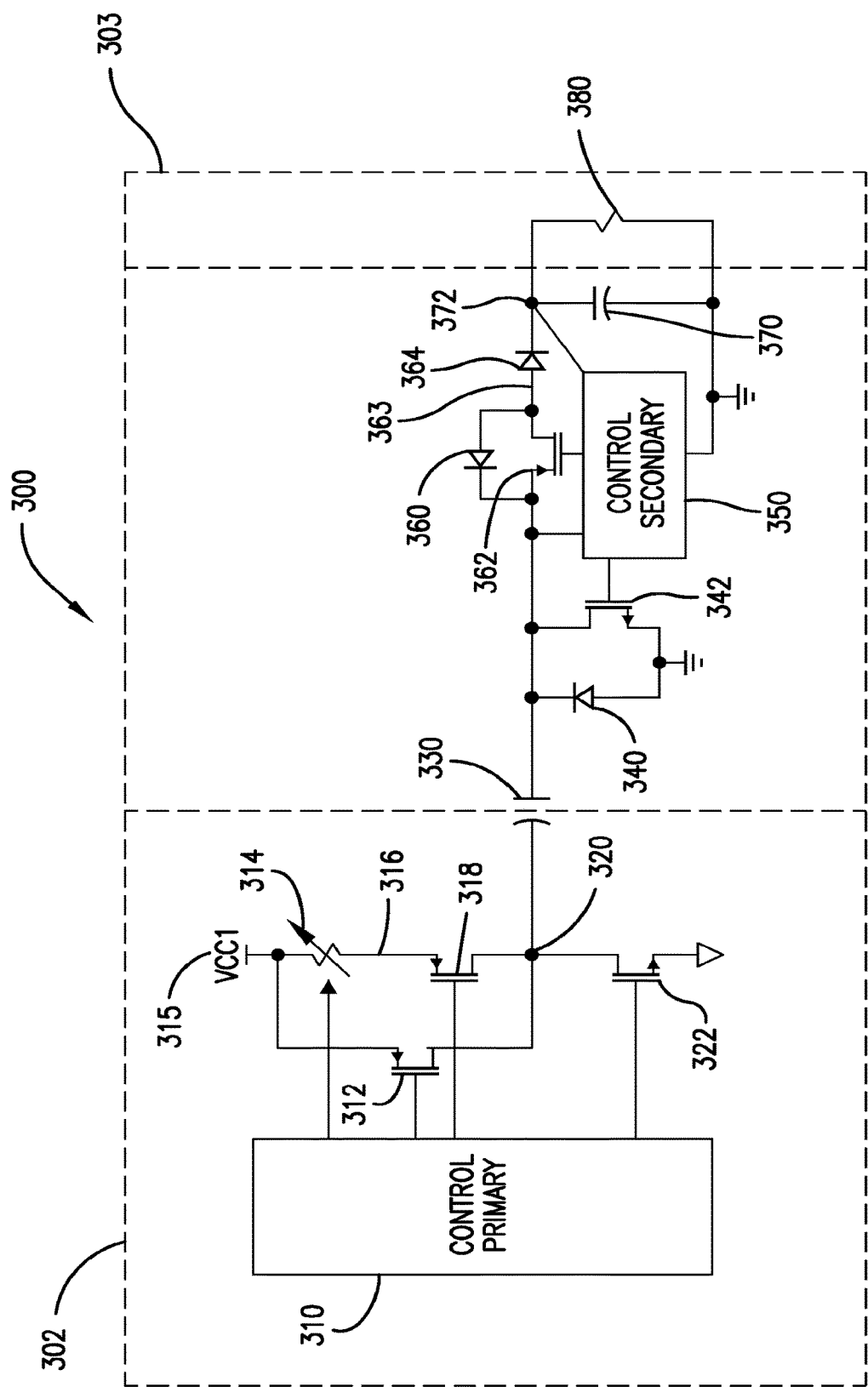
FIG. 3 is a diagram of another embodiment of the system configured to provide galvanic isolation of data or power with primary active component sensing of a secondary load with secondary control for dual data and power control over a single galvanic interface.

In accordance with another embodiment of the present invention, FIG. 3 is a diagram of the system 300 configured for galvanic isolation of data or power with primary side active component sensing of the secondary side load with secondary side control for dual data and power control over a single galvanic interface. The system 300 includes a primary side 302 and a secondary side 303. On the primary side 302, a Control Primary block 310 is gate-connected to an active sensing device 314, a first primary high side FET 312, a second primary high side FET 318, and primary low side FET 322. The active sensing device 314 is connected between a primary supply 315 and the primary high side FET 318. The first primary high side FET 312 is connected in parallel with the series connection of the active sensing device 314 and the second primary high side FET 318. A galvanic isolation component 330 is connected to the primary high side FETs 312, 318 and the primary low side FET 322, and connects the primary and secondary sides 302, 303 in such a manner that current does not flow through the galvanic isolation component 330 between the primary and secondary sides 302, 303. The galvanic isolation component 330 is connected between the primary side 302 and secondary side 303. On the secondary side 303, the galvanic isolation component 330 is connected to the cathode of a first secondary side diode 340, a secondary side communication FET 342, a secondary side blocking FET 362, and the cathode of a second secondary side diode 360. The first secondary side diode 340 and the secondary side communication FET 342 are connected in parallel, and their other common node is connected to the ground of the secondary side 303. The secondary side blocking FET 362 and the second secondary side diode 360 are connected in parallel, and their other common node is connected to the anode of a secondary side blocking diode 364. A node 372 is connected to the cathode of the secondary side blocking diode 364, a load capacitor 370, and the secondary side load 380. A Control Secondary block 350 is connected to the node 372 and to the gate controls for the third secondary side blocking FET 362 and the secondary side communication FET 342.

The primary and secondary sides 302, 303 are galvanically isolated from the other and connected only through the galvanic capacitor 330. The system 300 has the capability to provide bi-directional data between the primary side 302 and the secondary side 303. In addition, it can provide power to the secondary side load 380 from the primary side 302 to the secondary side 303. The primary side 302 can drive the secondary side 303 through one or more drivers. In this embodiment, the first primary high side FET 312, the series combination of the active sensing device 314, and the second primary high side FET 316 can be driven independently or in combination. In the event that the series combination of the active sensing device 314 and the second primary high side FET 316 are driven, the secondary side 303 can be communication by switching secondary side communication FET 342 on and off. During this time secondary side blocking FET 362 can be also turned off so that any load transients on the secondary side load 380 will not affect the communication between the secondary side 303 and the primary side 302. During the pulsing of switching secondary side communication FET 342, node 320 can be analyzed by the Control Primary block 310. These voltage pulses can then be evaluated for communication. Alternatively, current evaluation or the combination of voltage and current evaluation can be utilized. On the secondary side 303, during this time secondary side blocking diode 364 can be used in combination with load capacitor 370 to continuously provide power to the secondary load 380 during communication between the secondary side 303 and the primary side 302. Communication between the primary to secondary sides 302, 303 can be achieved by pulsing the primary side FETS 312, 318, 322. On the secondary side, the blocking FET 362 may be turned off and the Control Secondary block 350 can evaluate the pulses for communication. Alternative the clocking schemes of secondary side FETs 342, 362 can be utilized during the communication protocol. Alternatively, the secondary side blocking diode 364 can be replaced with a FET device to provide active blocking or alternatively removed if secondary side load 380 transients are not a concern. Alternatively, power could be provided from the secondary side 303 to the primary side 302.

Figure 4:
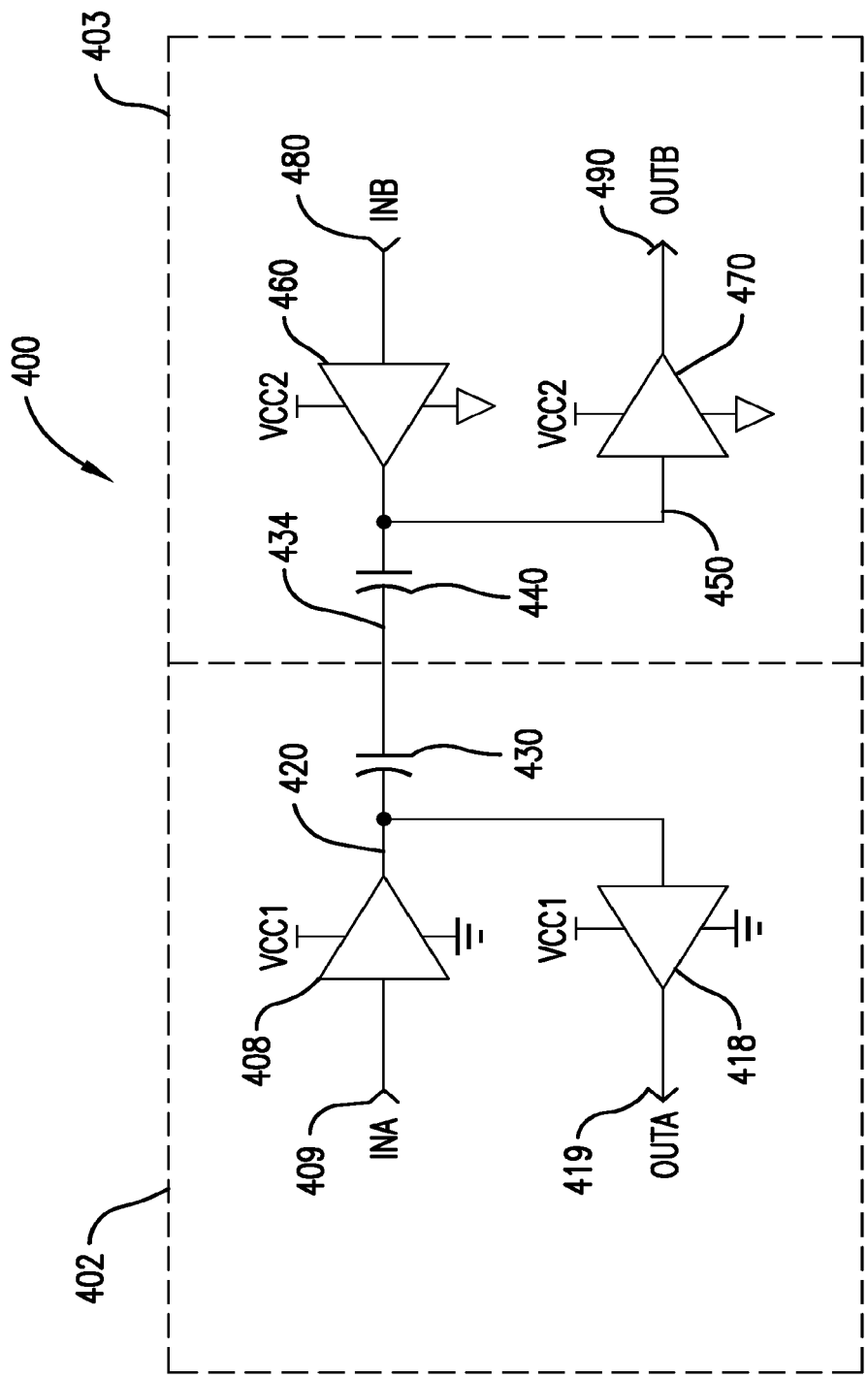
FIG. 4 is a diagram of another embodiment of the system configured to provide galvanic isolation of data or power with series capacitive galvanic isolation.

In accordance with another embodiment of the present invention, FIG. 4 is a diagram of the system 400 configured for galvanic isolation of data or power with series capacitive galvanic isolation. The system 400 includes a primary side 402 and a secondary side 403. On the primary side 402, an input $IN_A$ node 409 is connected to a first primary side driver 408. A node 420 is the output of the first primary side driver 408 and the input to a second primary side driver 418 and a first galvanic isolation capacitor 430. An $OUT_A$ node 419 is the output for the second primary side driver 418. The primary side 402 and the secondary side 403 are connected by a node 434 extending between the first galvanic isolation capacitor 430 and a second galvanic isolation capacitor 440. The other node 450 of the second galvanic isolation capacitor 440 is connected to the input of a first secondary side driver 470 and the output of a second secondary side driver 460. The output of the first secondary side driver 470 is connected to an $OUT_B$ node 490. The input of the second secondary side driver 460 is connected to an $IN_B$ node 480. Thus, the primary side 402 and the secondary side 403 are galvanically isolated by the first and second galvanic isolation capacitors 430, 440. To further enhance the galvanic voltage barrier, two or more galvanic capacitors are used in series. Each side 402, 403 of the system 400 can be provided with data transceiver capability as well as power transceiver capability.

Figure 5:
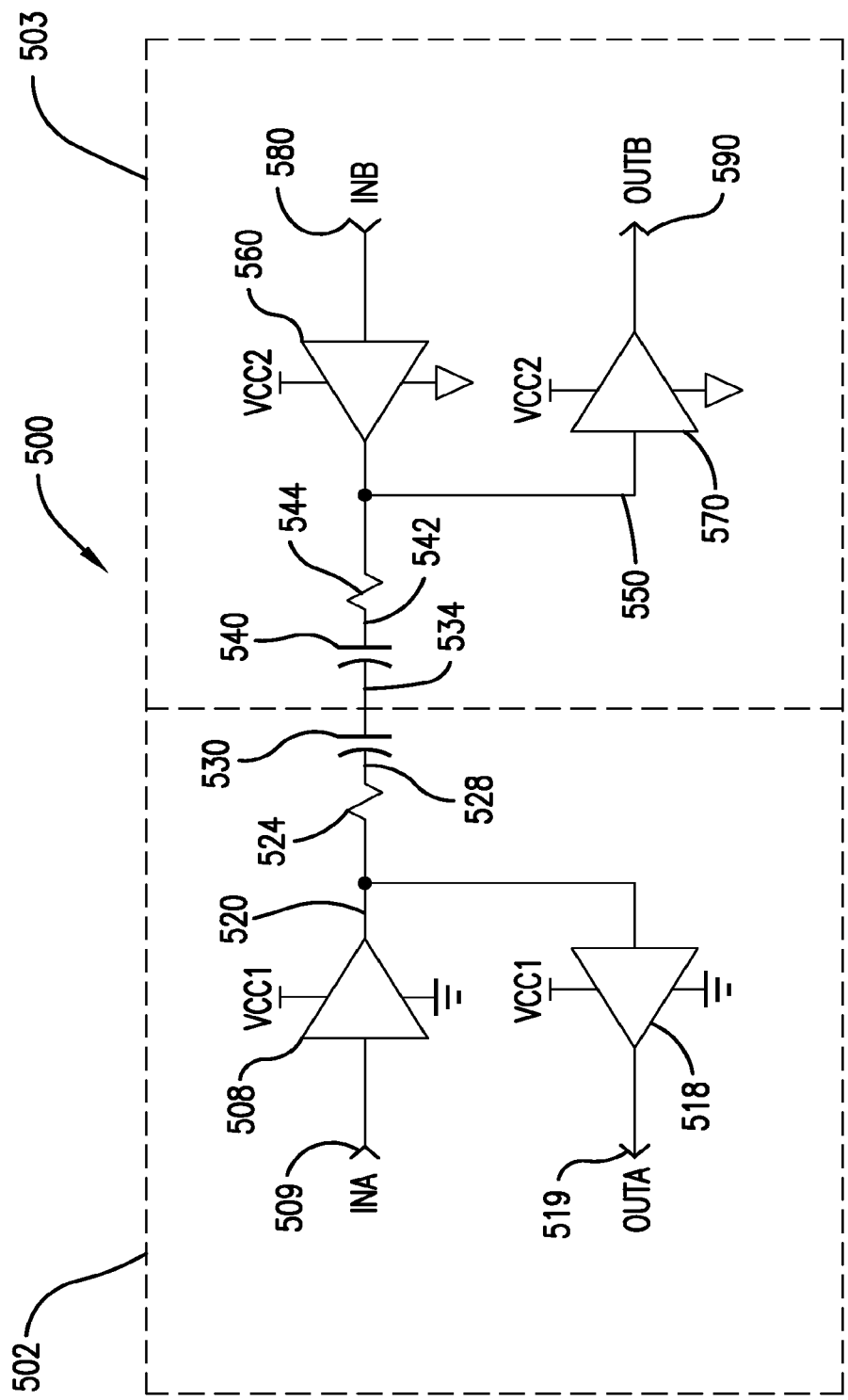
FIG. 5 is a diagram of another embodiment of the system configured to provide galvanic isolation of data or power with series capacitive and resistive galvanic isolation.

In accordance with another embodiment of the present invention, FIG. 5 is a diagram of the system 400 configured for galvanic isolation of data or power with series capacitive and resistive galvanic isolation. The system 500 includes a primary side 502 and a secondary side 503. On the primary side 502, an input $IN_A$ node 509 is connected to a first primary side driver 508. A node 520 is the output of the first primary side driver 508 and the input to a second primary side driver 518 and a first galvanic isolation resistor 524. An $OUT_A$ node 519 is the output for the second primary side driver 518. The other node 528 of the galvanic isolation resistor 524 is connected to a first galvanic isolation capacitor 530. The primary side 502 and secondary side 503 are connected by node 534. A node 534 of the first galvanic isolation capacitor 530 is connected to a second galvanic isolation capacitor 540. The other node 542 of the second galvanic isolation capacitor 540 is connected to a second galvanic isolation resistor 544. The other node 550 of the second galvanic isolation resistor 544 is connected to the input of a first secondary side driver 570 and the output of a second secondary side driver 560. The output of the first secondary side driver 570 is connected to an $OUT_B$ node 590. The input of the second secondary side driver 560 is connected to an $IN_B$ node 580.

FIG. 5 is similar to FIG. 4, except that the first galvanic isolation resistor 524 is in series with the first galvanic capacitor 530 and the second galvanic resistor 544 is in series with the second galvanic capacitor 540. These resistors 524, 544 provide voltage balancing for the galavanic capacitors 530, 540 and can provide larger galvanic isolation for the system 500. Alternatively additional passive devices such as resistors, inductors, or capacitors can be placed in any series or parallel combination to help provide additional ballasting between the galvanic isolation interfaces. Alternatively, active devices can be utilized to provide shunting and evaluation of the voltage and currents on either side of the galvanic isolation barrier.

Figure 6:
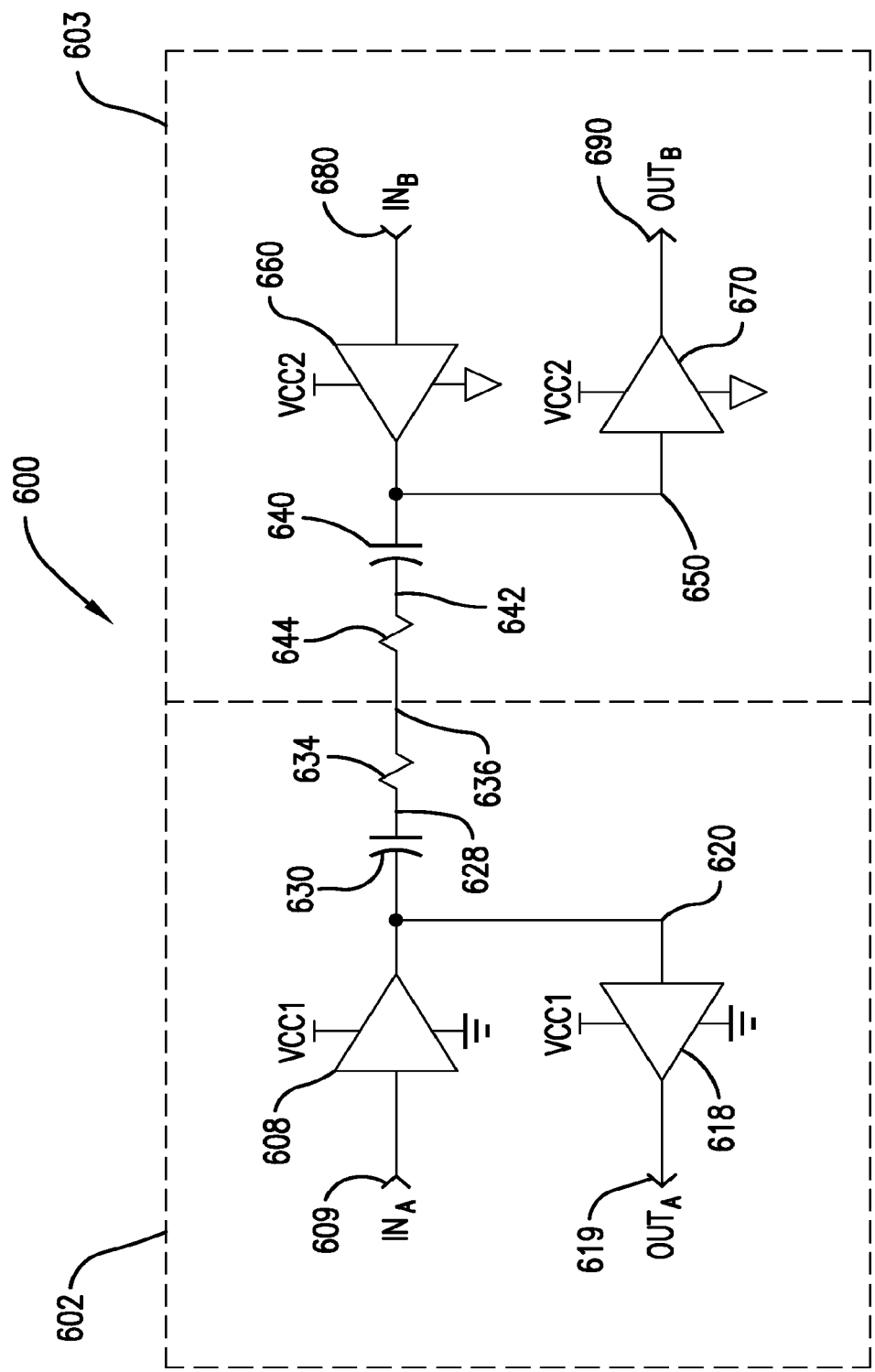
FIG. 6 is a diagram of another embodiment of the system configured to provide galvanic isolation of data or power with alternating series capacitive and resistive galvanic isolation.

In accordance with another embodiment of the present invention, FIG. 6 is a diagram of the system 600 configured to provide galvanic isolated data or power with alternating series capacitive and resistive galvanic isolation. The system 600 includes a primary side 602 and a secondary side 603. On the primary side 602, an input $IN_A$ node 609 is connected to a first primary side driver 608. A node 620 is the output of the first primary side driver 608 and the input to a second primary side driver 618 and a first galvanic isolation capacitor 630. An $OUT_A$ node 619 is the output for the second primary side driver 618. The other node 628 of the first galvanic isolation capacitor 630 is connected to a first galvanic isolation resistor 634. The primary side 602 and secondary side 603 are connected by a node 636. The node 636 of the first galvanic isolation resistor 634 is connected to a second galvanic isolation resistor 644. The other node 642 of the second galvanic isolation resistor 644 is connected to a second galvanic isolation capacitor 640. The other node 650 of the second galvanic isolation capacitor 640 is connected to the input of a first secondary side driver 670 and the output of a second secondary side driver 660. The output of the first secondary side driver 670 is connected to an $OUT_B$ node 690. The input of the second secondary side driver 660 is connected to an $IN_B$ node 680.

FIG. 6 is similar to FIG. 5, except that the galvanic isolation resistors 634, 644 are placed between the interface of the primary and secondary sides 602, 603. Alternatively any combination of passive or active components can be used on either side of the galvanic isolation capacitors 630, 640.

Figure 7A:
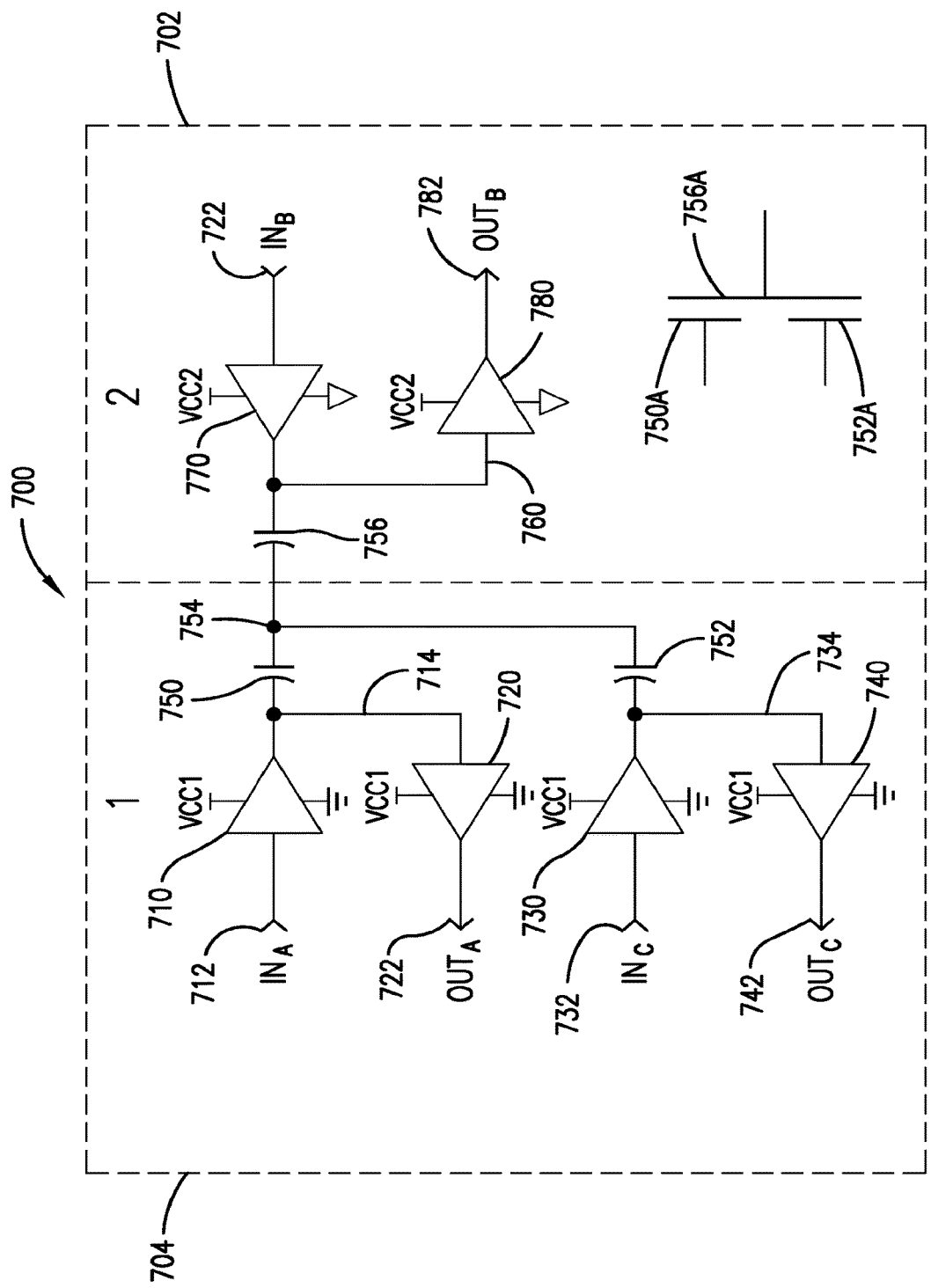
FIG. 7A is a diagram of another embodiment of the system configured to provide galvanic isolation of data or power with series and parallel capacitive galvanic isolation.

In accordance with another embodiment of the present invention, FIG. 7A is a diagram of the system 700 configured to provide galvanic isolated data or power with series and parallel capacitive galvanic isolation. The system 700 includes a primary side 704 and a secondary side 702. On the primary side 704, an input $IN_A$ node 712 is connected to first primary side driver 710. A node 714 is the output of the first primary side driver 710, and the input to a second primary side driver 720 and a first galvanic isolation capacitor 750. An $OUT_A$ node 722 is the output for the second primary side driver 720. An input $IN_C$ node 732 is connected to a third primary side driver 730. A node 734 is the output of the third primary side driver 730, and the input to a fourth primary side driver 740 and a second galvanic isolation capacitor 752. An $OUT_C$ node 742 is the output for the fourth primary side driver 740. The other node 754 of the second galvanic isolation capacitor 752 is connected to the first third galvanic isolation capacitor 750 and a third galvanic isolation capacitor 756. The primary side 704 and the secondary side 702 are connected by a node 754. The other node 760 of the third galvanic isolation capacitor 756 is connected to the input of a first secondary side driver 780 and the output of a second secondary side driver 770. The output of the first secondary side driver 780 is connected to an $OUT_B$ node 782. The input of the first secondary side driver 770 is connected to an $IN_B$ node 772. Alternatively, the galvanic isolation capacitors 750, 756, and 752 may be implemented using a single large plate on the secondary side for galvanic isolation capacitor 756A, and two smaller plates on the primary side for galvanic isolation capacitors 752A and 750A.

FIG. 7A is similar to FIG. 4, except that in the former more than two galvanic isolation capacitors for communication. On the primary side 704, there are two separate driver interfaces with the first and second galvanic isolation capacitors 750, 752. On the secondary side 702, there is the third galvanic isolation capacitor 756 which connects to the first and second galvanic isolation capacitors 750, 752. This embodiment allows power and/or data to be transferred to and from the two separate drivers 712, 722 and 732, 742. Alternatively, more than one galvanic isolation capacitor can be placed on the secondary side.

Figure 7B:
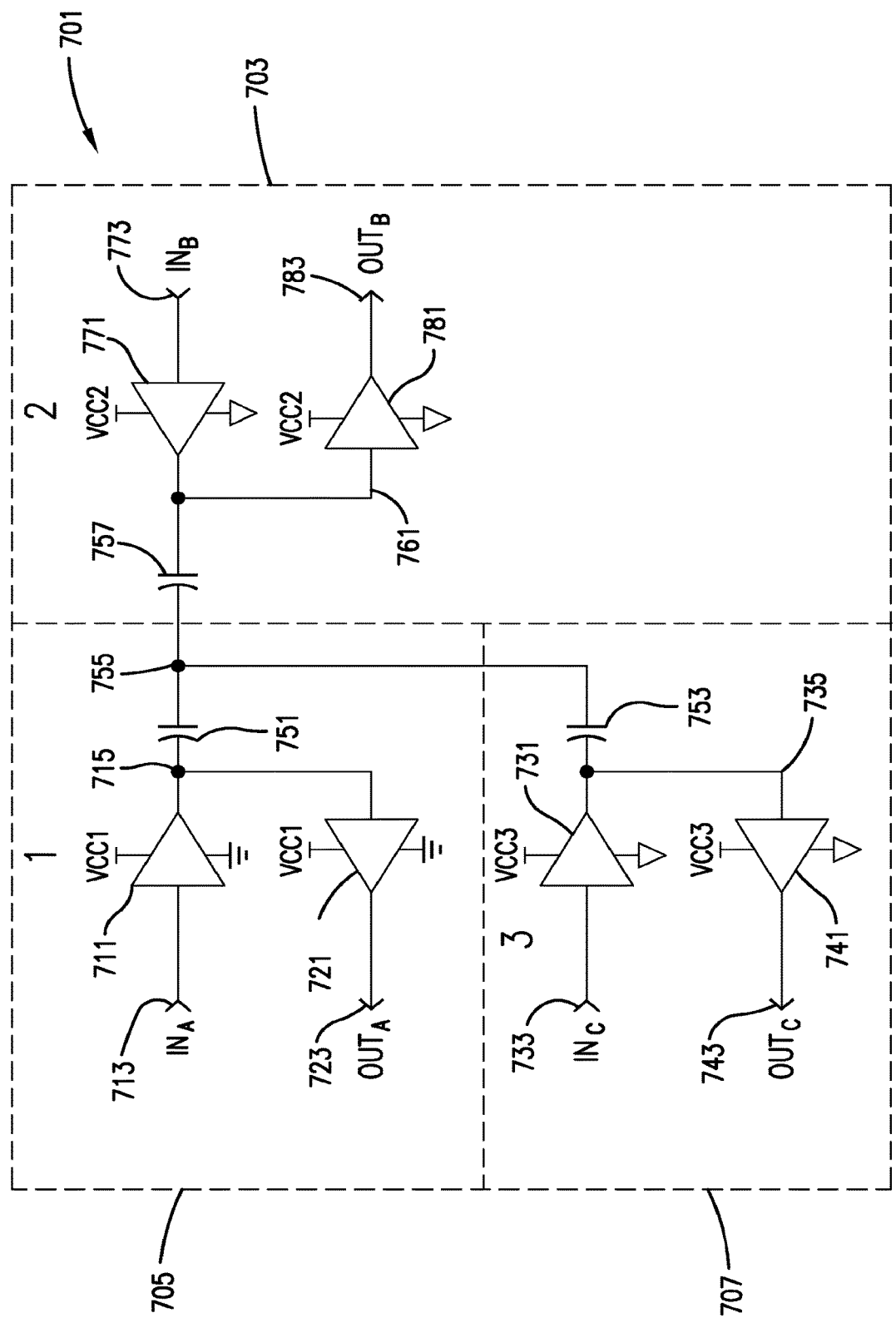
FIG. 7B is a diagram of another embodiment of the system configured to provide galvanic isolation of data or power with series and parallel capacitive galvanic isolation for more than two isolated ground planes.

In accordance with another embodiment of the present invention, FIG. 7B is a diagram of the system 701 configured to provide galvanic isolation of data or power with series and parallel capacitive galvanic isolation for more than two isolated ground planes. The system 701 includes a primary side 705, a secondary side 707, and a tertiary side 703. On the primary side 705, an input $IN_A$ node 713 is connected to a first primary side driver 711. A node 715 is the output of the first primary side driver 711, the input to second primary side driver 721 and a first galvanic isolation capacitor 751. An $OUT_A$ node 723 is the output for the second primary side driver 721. On the secondary side 707, an input INC node 733 is connected to a first secondary side driver 731. A Node 735 is the output of the first secondary side driver 731 and the input to a second secondary side driver 741 and a second galvanic isolation capacitor 753. An $OUT_C$ node 743 is the output for the second secondary side driver 741. The other node 755 of the second galvanic isolation capacitor 753 is connected to the first galvanic isolation capacitor 751 and a third galvanic isolation capacitor 757. The primary, secondary, and tertiary sides 704, 703, 707 are connected by node 755. The other node 761 of the third galvanic isolation capacitor 757 is connected to the input of a first tertiary side driver 781 and the output of a second tertiary side driver 771. The output of the first tertiary side driver 781 is connected to an $OUT_B$ node 783. The input of the second tertiary side driver 771 is connected to an $IN_B$ node 773.

FIG. 7B is similar to FIG. 7A, except that there are three sides: Primary 705, secondary 703, and tertiary 707. In this embodiment, data and/or power can be transferred to and from each respective isolated side. Alternatively, switching can be used in any of the respective sides to impede power and/or data from transferring to a respective side if there is a need to completely isolate a given isolated side from the other isolated sides. Alternatively, each respective isolated side can have more than one isolated galvanic capacitor connected to the isolated interface. Alternatively a ring or star configuration can be used to transfer power and/or data from/to more than two isolated sides from one another.

In accordance with another embodiment of the present invention, FIG. 8A is a diagram of the system 800 configured to provide galvanic isolation of data and power with capacitive galvanic isolation using Manchester encoding and decoding across the galvanic isolation region. The system 800 includes a primary side 802 and a secondary side 804. On the primary side 802, an $IN_A$ node 810 is connected to the input of a first primary side driver 812. The output node 814 of the first primary side driver 812 is connected to a first galvanic isolation capacitor 830. An $IN_B$ node 820 is connected to the input of a second primary side driver 822. The output node 824 of the second primary side driver 822 is connected to second galvanic isolation capacitor 840. The primary side 802 and the secondary side 804 are independently connected by the first and second galvanic isolation capacitors 830, 840. On the secondary side 804, the other node 832 of the first galvanic isolation capacitor 830 is connected to the input of a first secondary side driver 850. The output node 852 of the first secondary side driver 850 is connected to a Power block 870 and the input of a Data block 864. On the secondary side 804, the other node 842 of the second galvanic isolation capacitor 840 is connected to the input of a second secondary side driver 860. The output node 862 of the second secondary side driver 860 is connected to the Power block 870 and the input of the Data block 864. The output of the Data block 864 is connected to an $OUT_C$ node 866. Input data from the $IN_A$ node 810 is represented in a waveform A 890. Input data from the $IN_B$ node 820 is represented in waveform B 892. Output data from the $OUT_C$ node 866 is represented in waveform C 894.

In this embodiment, two separate signals, signal $IN_A$ 810 and signal $IN_B$ 820, are used to provide communication across the isolated interface. Both of these signals can then be used to generate power to the secondary side 804 which is conditioned through the Power block 870. Data manipulation is conditioned through the Data block 864. Input waveforms 890, 892 show that communication output is released as a Manchester code in output waveform 894. Alternatively, other communication interfaces can be used such as serial, I2C, and I2S. Alternatively, voltage, current, or the combination of voltage and current can be used to condition the data output. Alternatively, other forms of energy such as magnetic coupling can be used to condition the data output.

Figure 8B:
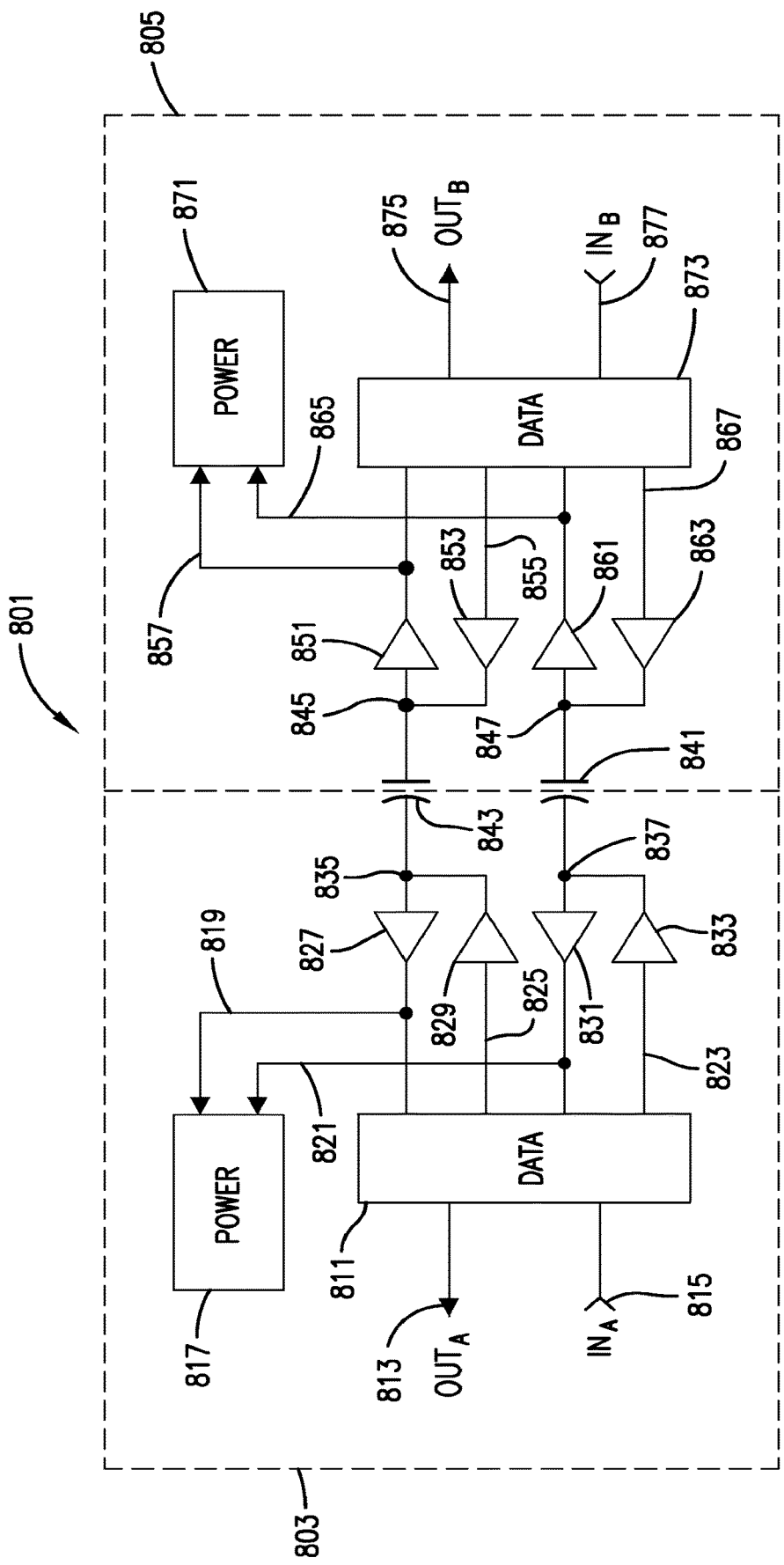
FIG. 8B is a diagram of another embodiment of the system configured to provide galvanic isolated bi-directional data and power with capacitive galvanic isolation using Manchester encoding and decoding across the galvanic isolation region.

In accordance with another embodiment of the present invention, FIG. 8B is a diagram of the system 801 configured to provide galvanic isolation of bi-directional data and power with capacitive galvanic isolation using Manchester encoding and decoding across the galvanic isolation region. The system 801 includes a primary side 803 and a secondary side 805. On the primary side 803, an input $IN_A$ node 815 is connected to an input of a primary side Data block 811. An output OUT$_A$ node 813 is connected to an output of the primary side Data block 811. A node 819 connects an input of the primary side Data block 811, the output of a first primary side driver 827, and an input to a primary side Power block 817. A node 821 connects an input of the primary side Data block 811, the output of a second primary side driver 831, and an input to the Power block 817. A node 825 connects an output of the primary side Data block 811 to the input of a third primary side driver 829. A node 823 connects an output of the primary side Data block 811 to the input of a fourth primary side driver 833. The output node 835 of the second primary side driver 829 is connected to the input of the first primary side driver 827 and a first galvanic isolation capacitor 843. The output node 837 of the fourth primary side driver 833 is connected to the input of the second primary side driver 831 and the second galvanic isolation capacitor 841. The primary side 803 and the secondary side 805 are independently connected by the first and second galvanic isolation capacitors 843, 841. On the secondary side 805, the other node 845 of the first galvanic isolation capacitor 843 is connected to the input of a first secondary side driver 851 and to the output of a second secondary side driver 853. The output node 857 of the first secondary side driver 851 is connected to an input of a secondary side Power block 871 and to an input of a secondary side Data block 873. The input node 855 of the second secondary side driver 853 is connected to an output of the secondary side data block 873. On the secondary side 805, the other node 847 of the second galvanic isolation capacitor 841 is connected to the input of a third secondary side driver 861 and to the output of a fourth secondary side driver 863. The output node 865 of the third secondary side driver 861 is connected to an input of the secondary side Power block 871 and to an input of the secondary side Data block 873. The input node 867 of the fourth secondary side driver 863 is connected to an output of the secondary side Data block 873. An OUT$_B$ node 875 is connected to an output of the secondary side Data block 873. An IN$_B$ node 877 is connected to an input of the secondary side Data block 873.

FIG. 8B is similar to FIG. 8A, except that data and/or power can be transferred or received by the primary side 803 or the secondary side 805.

Figure 9A:
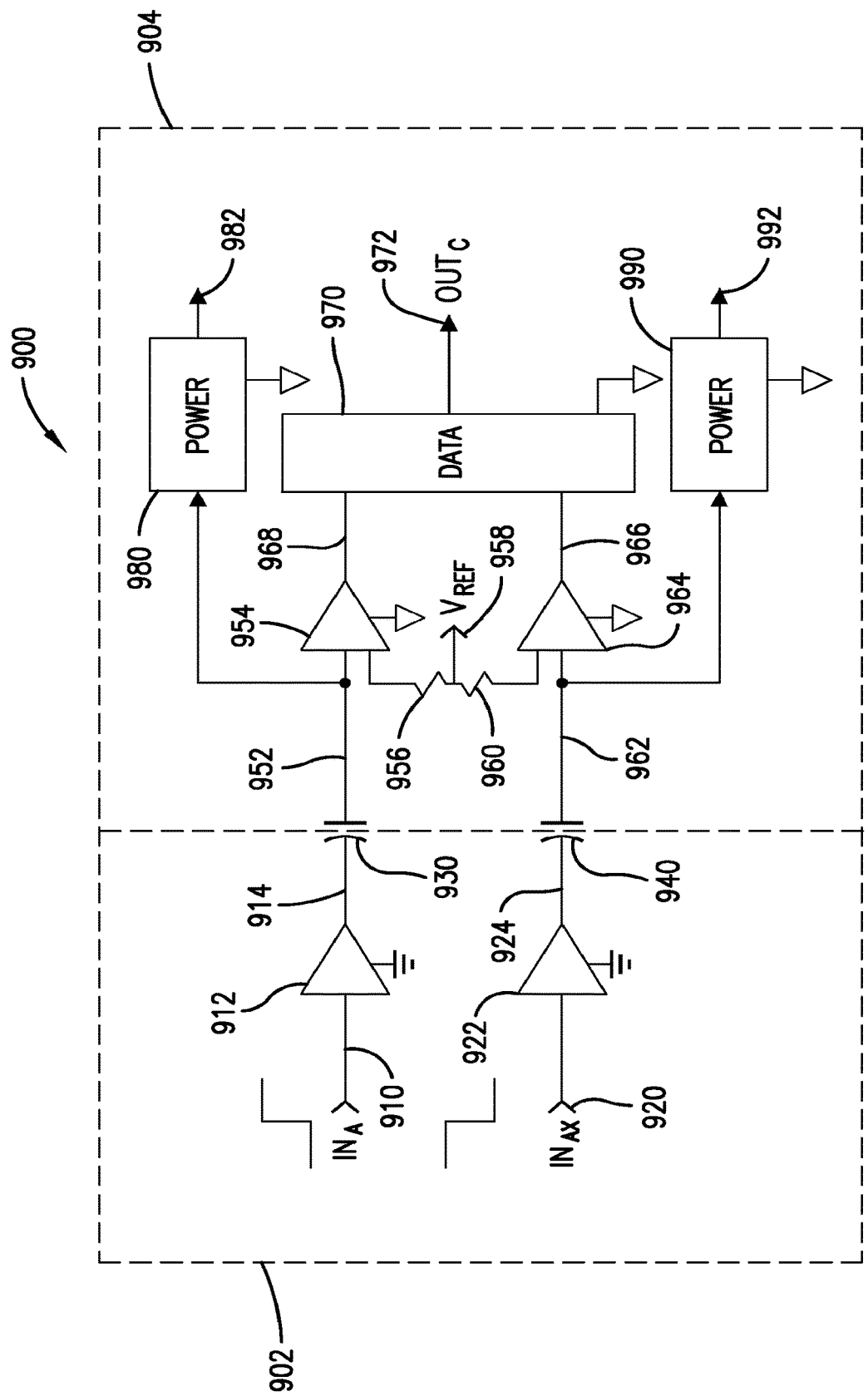
FIG. 9A is a diagram of another embodiment of the system configured to provide galvanic isolation of data and power with capacitive galvanic isolation using differential power and data across the galvanic isolation region.

In accordance with another embodiment of the present invention, FIG. 9A is a diagram of the system 900 configured to provide galvanic isolation of data and power with capacitive galvanic isolation using differential power and data across the galvanic isolation region. The system 900 includes a primary side 902 and a secondary side 904. On the primary side 902, a positive differential input IN$_A$ node 910 is connected to the input of a first primary side driver 912. The output node 914 of the first primary side driver 912 is connected to a first galvanic isolation capacitor 930. A negative differential input IN$_{AX}$ node 920 is connected to the input of a second primary side driver 922. The output node 924 of the second primary side driver of 922 is connected to a second galvanic isolation capacitor 940. The primary side 902 and the secondary side 904 are independently connected by the first and second galvanic isolation capacitors 930, 940. On the secondary side 904, the other node 952 of the first galvanic isolation capacitor 930 is connected to the first input of a first secondary side differential driver 954 and an input to a first secondary side Power block 980. The other node 962 of the second galvanic isolation capacitor 940 is connected to the first input of a second secondary side differential driver 964 and an input to a second secondary side Power block 990. A voltage reference 958 connects to a first resistor 956 and a second resistor 960. The other side of the first resistor 956 is connected to the second input of the first secondary side differential driver 954. The other side of the second resistor 960 is connected to the second input of the second secondary side differential driver 964. The output node 968 of the first secondary side differential driver 954 is connected to an input of a secondary side differential Data block 970. The output node 966 of the second secondary side differential driver 964 is connected to an input of the secondary side differential data block 970. An OUT$_C$ node 972 is connected to the output of the secondary side differential Data block 970. The output of node 982 is connected to the output of the first secondary side power block 980. The output of node 992 is connected to the output of the second secondary side power block 990.

FIG. 9A is similar to FIG. 7A, except that a differential signal includes signal IN$_A$ 910 and signal IN$_{AX}$ 920. This signal is propagated from the primary side 902 to the secondary side 904. The first and second secondary side differential drivers 954, 964 are configured to function as differential comparators. The output of these differential data comparators is then manipulated in the secondary side Data block 970, which provides the appropriate Boolean output 972. Power is provided to the secondary side 904 and manipulated and combined through the first and second secondary side Power modules 982, 992. Alternatively, a single power module can be used.

Figure 9B:
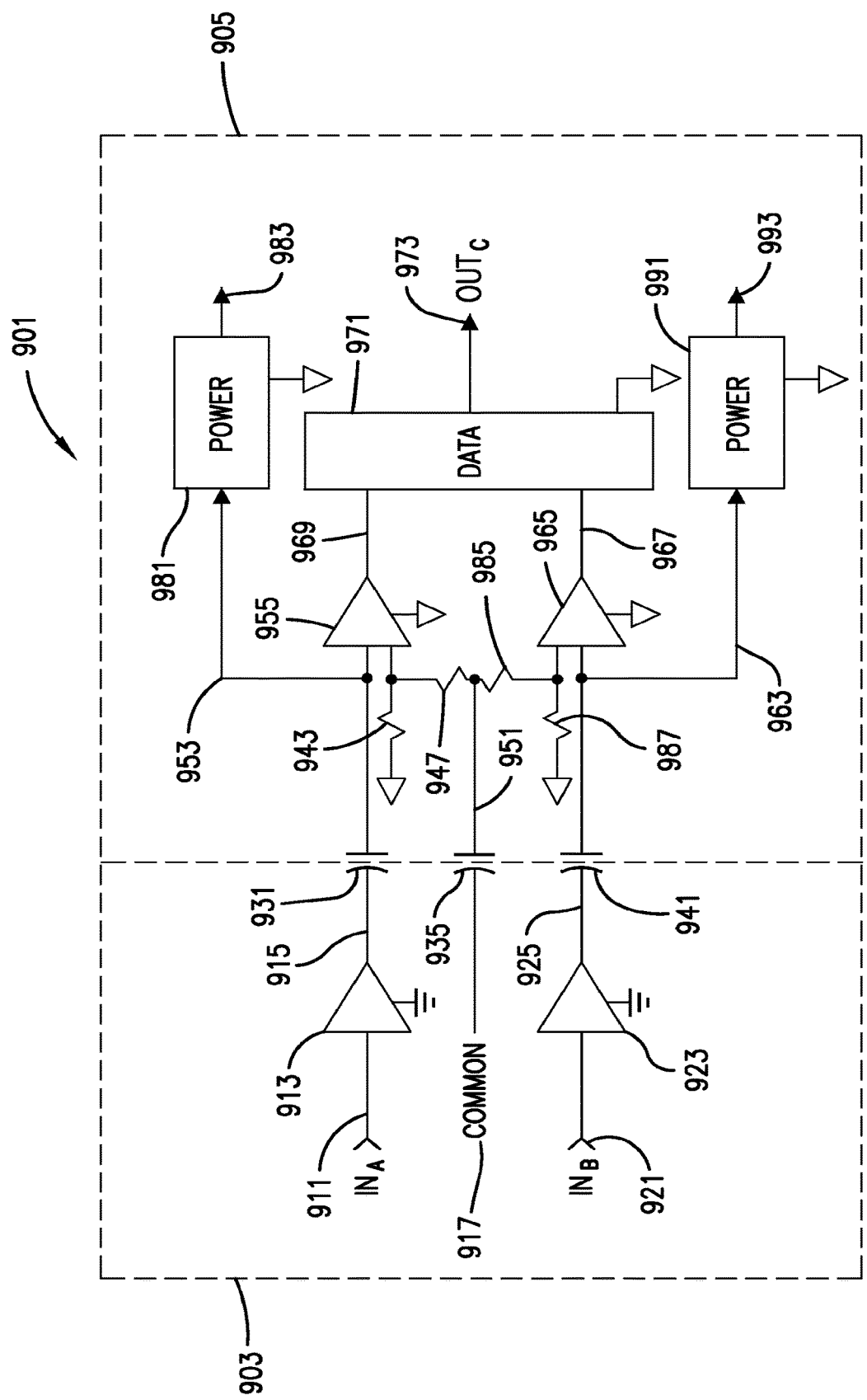
FIG. 9B is a diagram of another embodiment of the system configured to provide galvanic isolation of data and power with capacitive galvanic isolation using isolated common rail as a reference for one or more power and data links across the galvanic isolation region.

In accordance with another embodiment of the present invention, FIG. 9b is a diagram of the system 901 configured to provide galvanic isolation of data and power with capacitive galvanic isolation using an isolated common rail as a reference for one or more power and data links across the galvanic isolation region. The system 901 includes a primary side 903 and a secondary side 905. On the primary side 903, an input IN$_A$ node 911 is connected to the input of a first primary side driver 913. The output node 915 of the first primary side driver 913 is connected to a first galvanic isolation capacitor 931. An input IN$_B$ node 921 is connected to the input of a second primary side driver 923. The output node 925 of the second primary side driver of 923 is connected to a second galvanic isolation capacitor 941. A COMMON node 917 is connected to a third galvanic isolation capacitor 935. The primary side 903 and the secondary side 905 are independently connected by the first, second, and third galvanic isolation capacitors 931, 941, 935. On the secondary side 905, the other node 953 of the first galvanic isolation capacitor 931 is connected to the first input of a first secondary side differential driver 955 and an input to a first secondary side Power block 981. The other node 963 of the second galvanic isolation capacitor 941 is connected to the first input of a second secondary side differential driver 965 and an input to a second secondary side Power block 991. The other node 951 of the third galvanic capacitor 935 is connected to first and second resistors 947, 985. The other node 945 of the first resistor 947 is connected to first secondary side ground-referenced resistor 943 and the second input of the first secondary side differential driver 955. The other node 989 of the second resistor 985 is connected to a second secondary side ground-referenced resistor 987 and the second input of the second secondary side differential driver 965. The output node 969 of the first secondary side differential driver 955 is connected to an input of a secondary side differential Data block 971. The output node 967 of the second secondary side differential driver 965 is connected to an input of the secondary side differential Data block 971. An output OUT$_C$ node 973 is connected to the output of the secondary side differential Data block 971. The output of node 983 is connected to the output of the first secondary side Power block 981. The output of node 993 is connected to the output of the second secondary side Power block 991.

FIG. 9B is similar to FIG. 9A, except that the additional COMMON signal 917 is provided on the primary side 903. The COMMON signal 917, as well as signals $IN_A$ 911 and $IN_B$ 921 from primary side are transferred across the isolation interface to the secondary side 905. The COMMON signal 917 is provided to the first and second secondary side differential drivers 955, 965 which are configured to function as first and second comparators. The output of these comparators is buffered by the secondary side Data block 971 and then Boolean manipulated to provide output $OUT_C$ 973. Alternatively, more than one output can be provided. The first and second secondary side Power blocks 981, 991 are provided with power via node 953 and node 963, respectively. Each of these power signals is then manipulated through the first and second secondary side Power blocks 981, 991. Alternatively, one Power block may be used. Alternatively, more than two signals may be provided for power and/or data transfer.

In accordance with another embodiment of the present invention, FIG. 10 is a diagram for a capacitive galvanic isolation component configured to provide galvanic isolation of power and data transmission, wherein the galvanic isolation component can be realized with a plurality of combinations of resistive and capacitive components. A galvanic isolation capacitor 1000 is alternatively represented by the series combination of a galvanic isolation capacitor 1010 and a galvanic isolation resistor 1020, or by the series combination of a galvanic isolation resistor 1030, a galvanic isolation capacitor 1040, and a galvanic isolation resistor 1050. Alternative to the resistors 1020, 1030, 1050, other active and passive components can be used to balance the energy across the devices. Alternatively, more than one galvanic isolated component can be used and each of them can be connected to another.

Figure 11A:
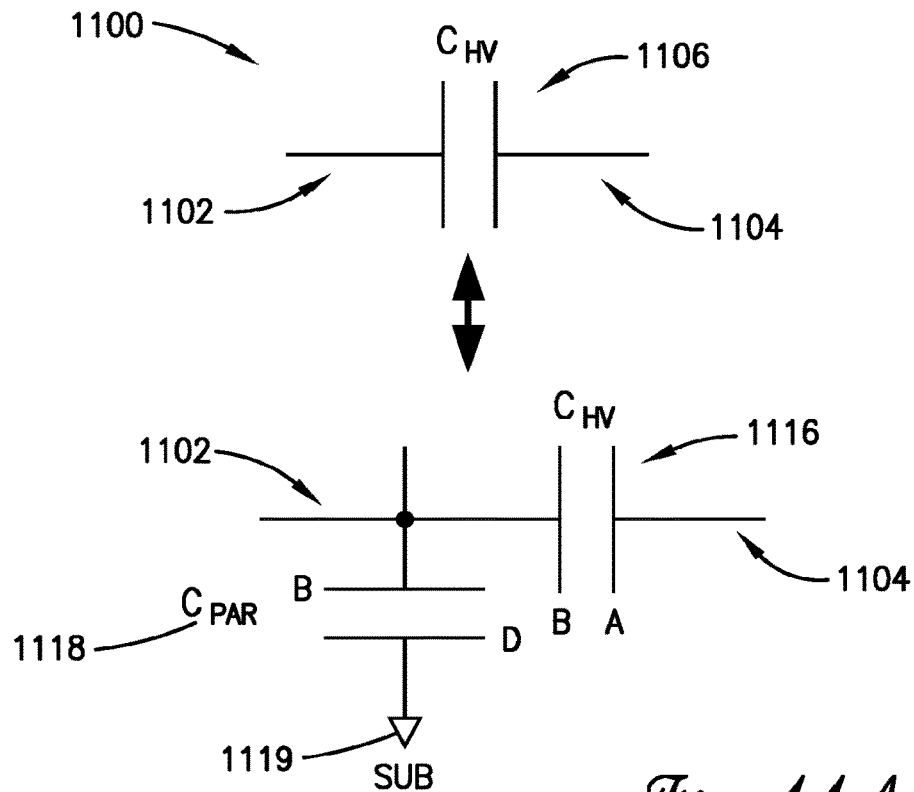
FIG. 11A is a diagram of an embodiment of a circuit schematic for a capacitive galvanic isolation component with an associated parasitic component.
Figure 11B:
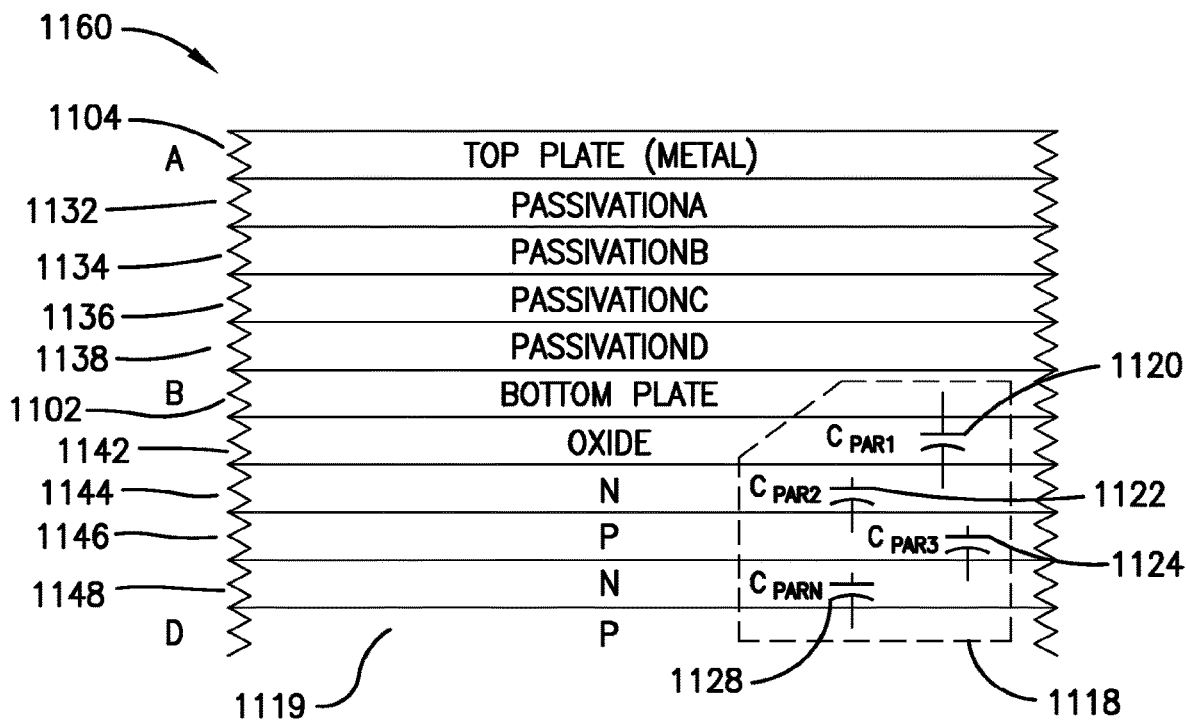
FIG. 11B is a cross-sectional process representation of the circuit of FIG. 11A configured to reduce parasitic effects.

In accordance with another embodiment of the present invention, FIG. 11A is a diagram of a circuit 1100 configured to provide capacitive galvanic isolation of power and data transmission with associated parasitic components. A galvanic isolation capacitor 1106 having first and second nodes 1102, 1104, can be realized as follows: A parasitic capacitor 1118 is connected to a galvanic isolated capacitor 1116, and the other side of the parasitic capacitor 1118 is connected to a SUB 1119. More specifically, FIG. 11B is a cross-sectional process representation 1160 of the circuit 1100. Galvanic isolation capacitor 1116 is the series stack of Top plate metal node 1104, Passivation A 1132, Passivation B 1134, Passivation C 1136, Passivation D 1138, and Bottom Plate node 1102. Parasitic capacitor 1118 is the series stack of Bottom plate node 1102, Oxide 1142, N diffusion 1144, P diffusion 1146, N diffusion 1148, and P diffusion SUB 1119. The parasitic capacitance is undesirable because it attenuates both the data and the power signals. In order to reduce the parasitic capacitance, a series stack of oxide 1142 is included. Additional series stacks of altering diffusion polarities 1144, 1146, 1148 are included to increase the series capacitance which reduces the overall capacitance value of the parasitic capacitor 1118.

Figure 12:
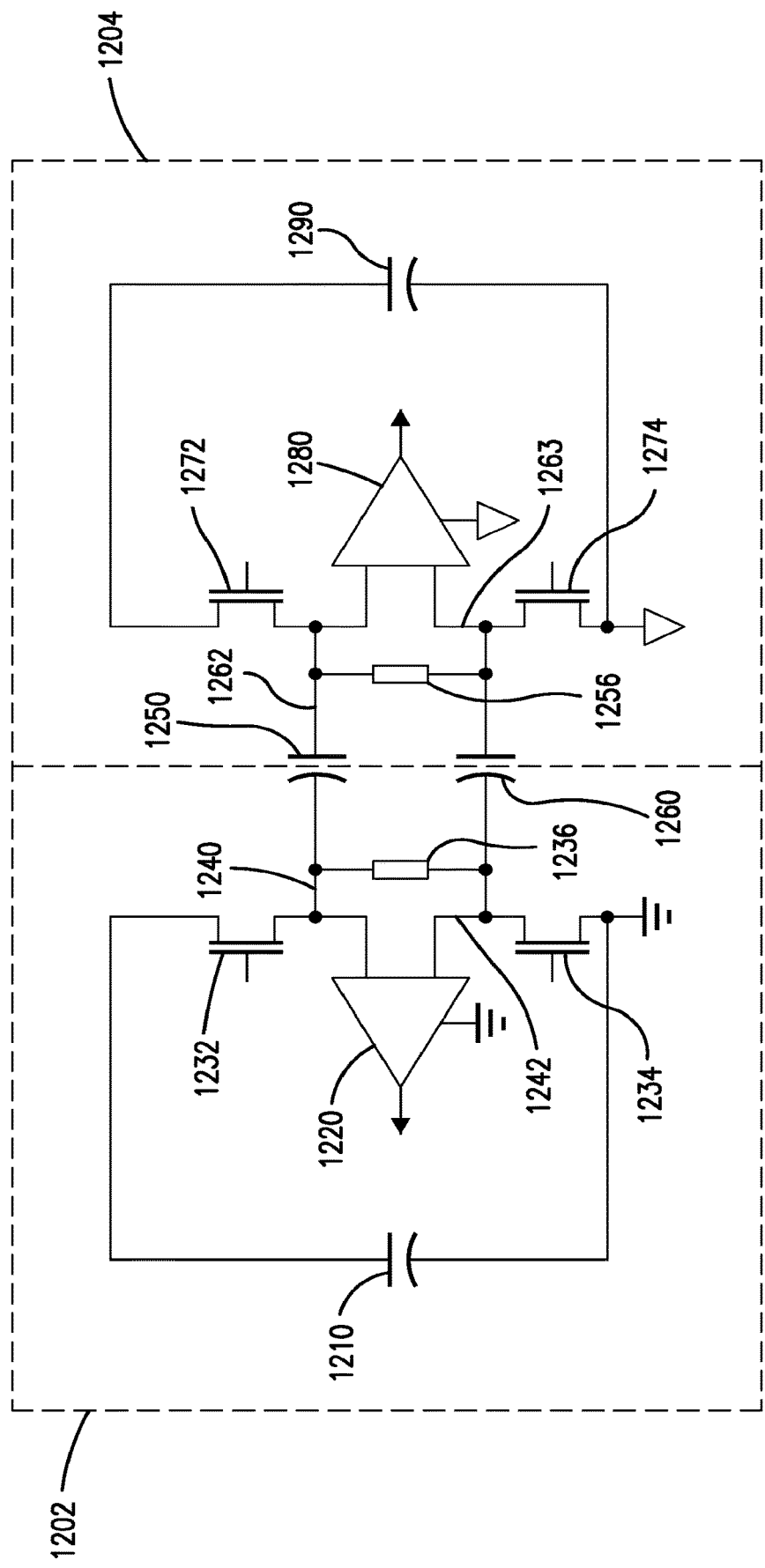
FIG. 12 is a diagram of an embodiment of the system configured to provide galvanic isolation of data and power with capacitive galvanic isolation using controller area networking across the galvanic isolation region.

In accordance with another embodiment of the present invention, FIG. 12 is a diagram of the system 1200 configured to provide galvanic isolation of data and power with capacitive galvanic isolation using controller area networking across the galvanic isolation region. The system 1200 includes a primary side 1202 and a secondary side 1204. On the primary side 1202, a capacitor supply reference 1210 is connected to a primary side supply and ground voltage reference. A primary side supply voltage-referenced high-side FET 1232 is connected to the node 1240 of a first input of a primary side differential driver 1220, a first centering resistor 1236, and a first galvanic isolation capacitor 1250. A primary side ground-referenced low-side FET 1234 is connected to the node 1242 of a second input of the primary side differential driver 1120, a second centering resistor 1236, and a second galvanic isolation capacitor 1260. The primary side 1202 and the secondary side 1204 are independently connected by galvanic isolation capacitors 1250, 1260. On the secondary side 1204, the other node 1262 of the first galvanic isolation capacitor 1250 is connected to secondary side supply voltage-referenced high-side FET 1272, the second centering resistor 1256, and a first input of a secondary side differential driver 1280. The other node 1263 of the second galvanic isolation capacitor 1260 is connected to secondary side ground-referenced low-side FET 1274, the other side of the second centering resistor 1256, and a second input of the secondary side differential driver 1280. A secondary side capacitor supply reference 1290 is connected to a secondary side supply and ground voltage reference. In this embodiment, on each of the isolated sides a transceiver is shown which differentially drives or receives the signal from one side to the other. Primary and secondary side capacitor supply references 1210, 1290 are on each side where the power can be transceived from either side.

Figure 13:
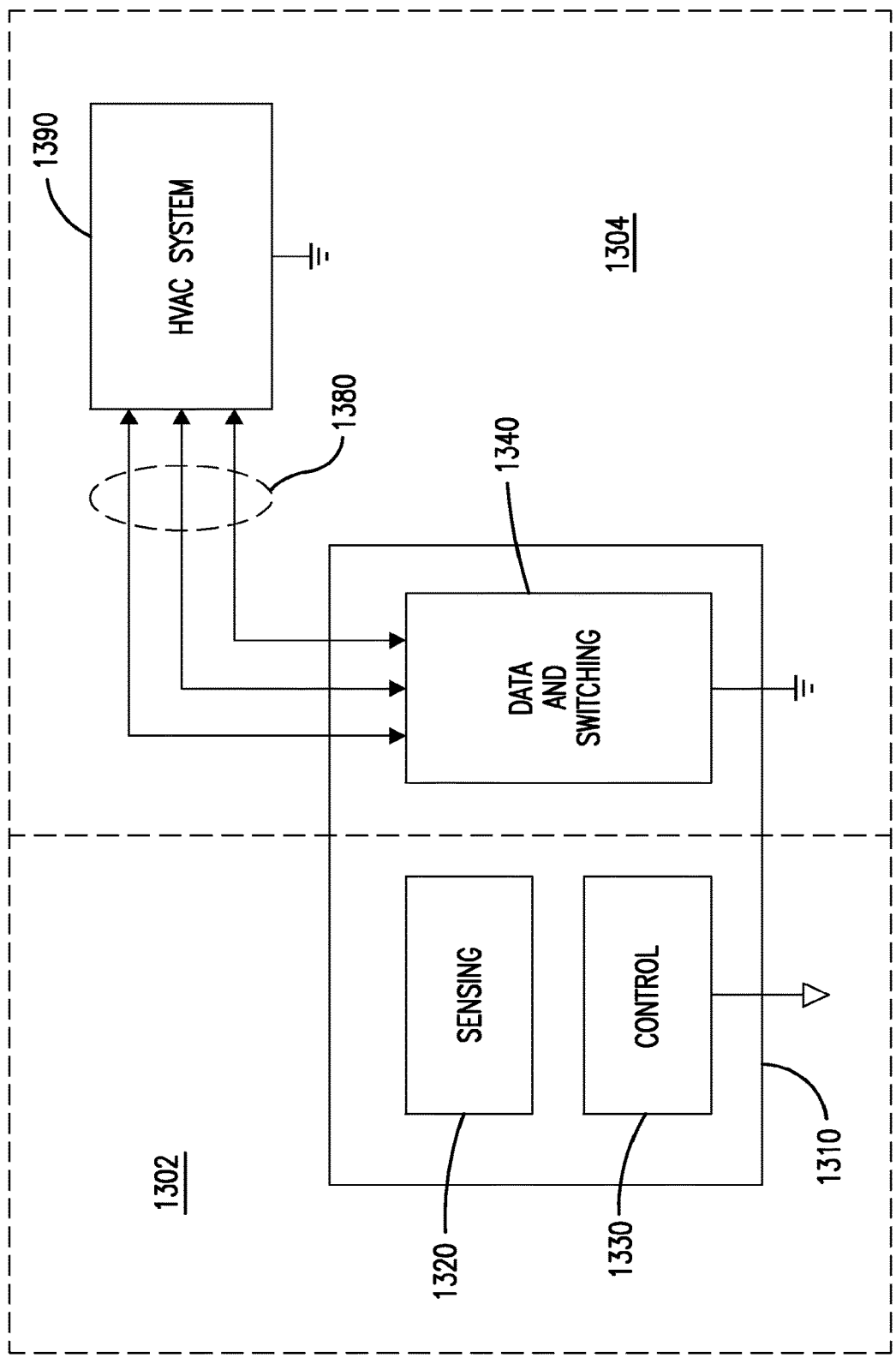
FIG. 13 is a diagram of another embodiment of the system implemented as a heating, ventilation, and air condition system employing galvanic isolation of data and/or power from a main control unit to a secondary load.

In accordance with another embodiment of the present invention, FIG. 13 is a diagram of the system 1300 implemented as a heating, ventilation, and air conditioning (HVAC) system using galvanic isolation of data and/or power from a main control unit 1310 to a secondary side HVAC system load 1390. The system 1300 includes a primary side 1302 and a secondary side 1304. On the primary side 1302, the main control unit 1310 includes a sensing module 1320 and a control module 1330. On the secondary side 1304, the main control unit 1310 includes a data and switching control unit 1340. The secondary side switching control unit 1340 is connected to a secondary side wire interface 1380, which is connected to the secondary side HVAC system load 1390. More specifically, the thermostat controller 1310 consists of the sensing module 1320, the control module 1330, and the data and switching module 1340. Data and power are transferred using galvanic isolation from the primary side 1302 to the secondary side 1304. This data and power is then used to drive and control the HVAC system 1390. Information can then be passed back from the HVAC system 1390 to the data and switching module 1340, and then back to the sensing 1320 and control modules 1330 in the thermostat system 1310. Alternatively, power can be transferred from the secondary side to the primary side. Alternatively, the system can be a security system requiring isolated power and data.

Figure 14:
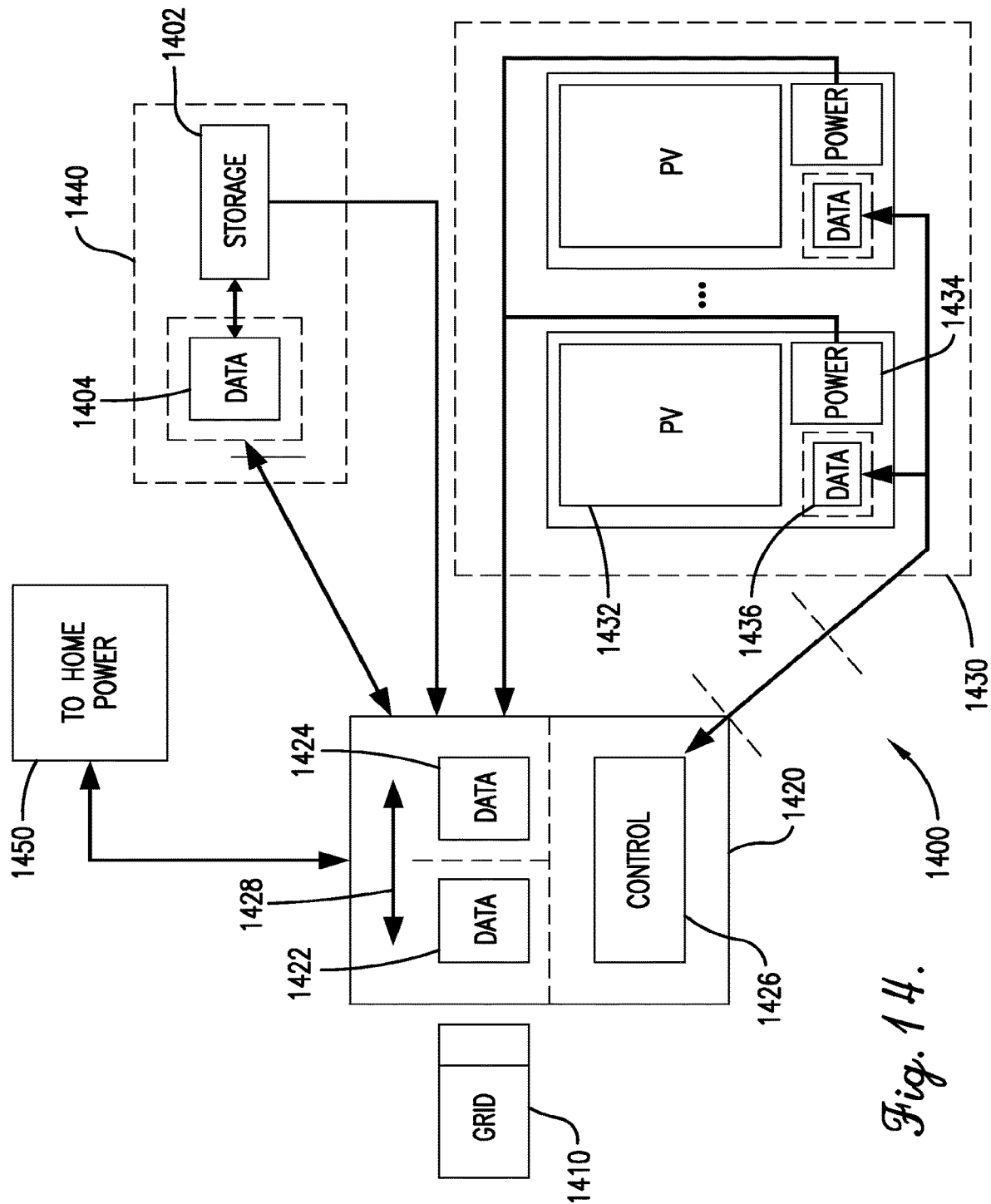
FIG. 14 is a diagram of another embodiment of the system implemented as a smart grid system employing galvanic isolation of data and/or power from a main power grid to a secondary storage unit and a tertiary plurality of photo-voltaic micro-inverters.

In accordance with another embodiment of the present invention, FIG. 14 is a diagram of the system 1400 implemented as a smart grid system using galvanic isolation of data and/or power from a main power grid 1410 to a secondary storage unit 1440 and a tertiary plurality of photo-voltaic micro-inverters 1430. A smart grid controller 1420 is connected to the main power grid 1410, the secondary storage unit 1440, the tertiary plurality of photo-voltaic micro-inverters 1430, and a home load 1450. The smart grid controller 1420 includes data 1422, 1424, a smart grid sensing and control unit 1426, and a smart switching unit 1428. The secondary storage unit 1440 includes a storage element 1402, a data control unit 1404, and a connection to transfer power and/or data between the storage element 1402 and the smart grid controller 1420. The plurality of photo-voltaic micro-inverters 1430 includes a photovoltaic unit 1432, a power conversion and management unit 1434, and a data control unit 1436. More specifically, the smart grid controller 1420 can have two or more isolated sub-systems that can interface with one another to transfer power and/or data. In this embodiment, the smart grid controller 1420 is interfaced by isolation for to the grid system 1410, the main home power system 1450, the main home power storage system 1440, and the home harvesting system 1430. In each of these systems isolation may be necessary to prevent voltage transients from damaging the system or creating a hazardous condition by allowing unwanted large voltage gradients from one power element to another. Alternatively, radio-frequency wireless links can be used with satellite sensors. This would link with the smart grid control unit 1426 in order to make optimum power decisions. Some of these decisions could sense or otherwise take into account cloud cover, outside temperature, individual room temperature, individual room insolence, appliance and lighting sensing for each household element.

Figure 15A:
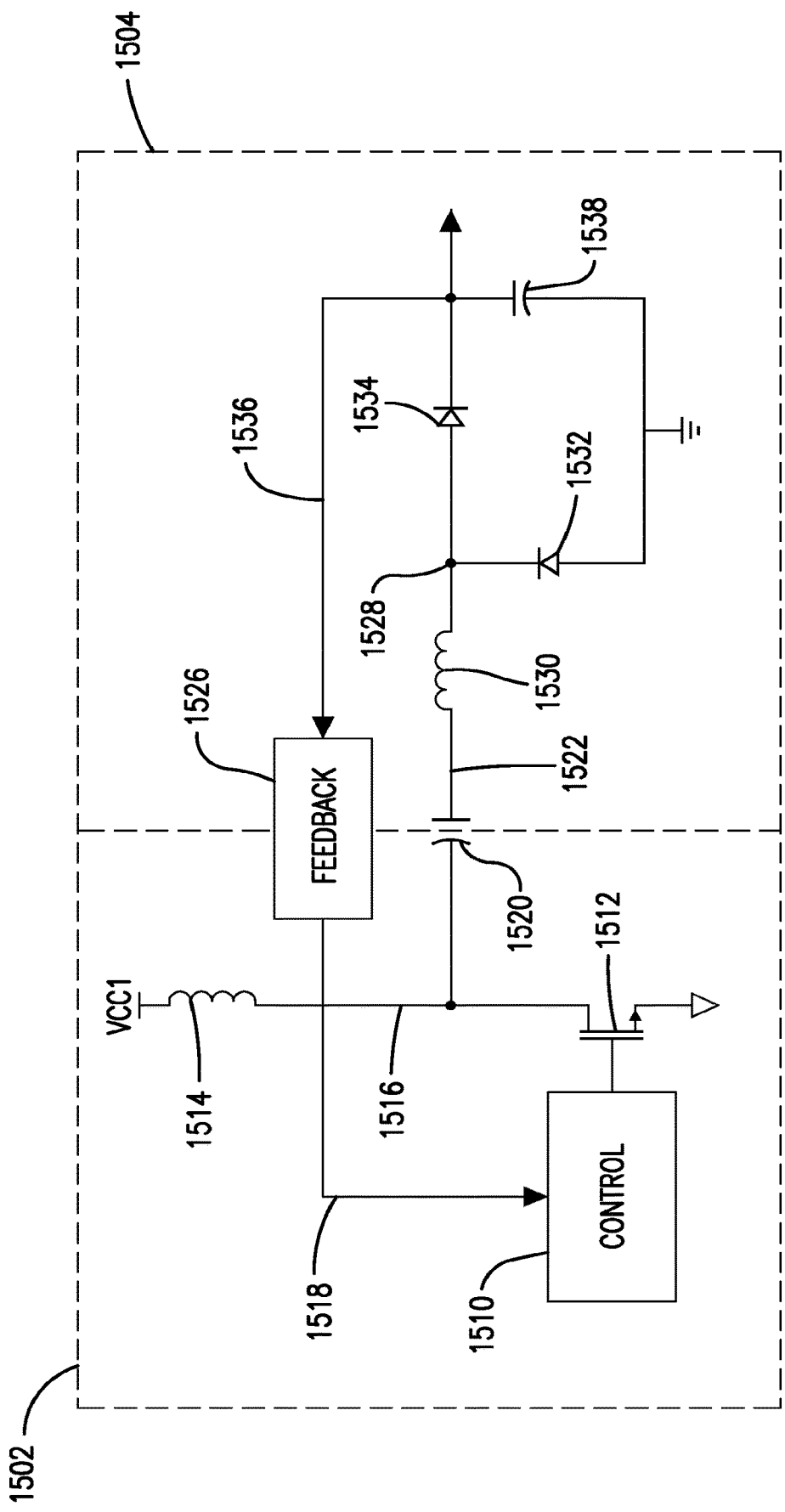
FIG. 15A is a diagram of another embodiment of the system configured to provide galvanic isolation of power using a resonant configuration and having feedback between the galvanic interface.

In accordance with another embodiment of the present invention, FIG. 15A is a diagram of the system 1500 configured to provide galvanic isolation of power using a resonant configuration and having feedback between the galvanic interface. The system 1500 includes a primary side 1502 and a secondary side 1504. On the primary side 1502, the output of a Control block 1510 is connected to a gate of a primary side ground-referenced FET 1512. The input node 1518 of the Control block 1510 is connected to the output of a Feedback block 1526. The Feedback block 1526 is connected between the primary side 1502 and secondary side 1504. The primary side ground-referenced FET 1512 is connected via node 1516 to a supply-referenced inductor 1514 and a galvanic isolation capacitor 1520. The galvanic isolation capacitor 1520 is connected between the primary side 1502 and secondary side 1504. On the secondary side, the other node 1522 of the galvanic isolation capacitor 1520 is connected to a secondary side inductor 1530. The other node 1528 of the secondary side inductor 1530 is connected to the cathode of a first secondary side ground-connected diode 1532 and the anode of a second secondary side diode 1534. An output node 1536 is the cathode of the second secondary side diode 1534 and is connected to a secondary side ground-referenced capacitor 1538 and the input of the feedback Block 1526.

More specifically, a combination of passive components is used to further enhance power transfer efficiency across the isolated interface while still providing data transfer. The primary side 1502 includes the FET 1512 which functions as a control module driving switching element. The FET 1512 is connected to the inductor 1514 and configured to cause energy stored in the inductor to be boosted across the galvanic isolation capacitor 1520 interface. On the secondary side, the galvanic isolation capacitor 1520 is connected in series with the inductor 1530 which provides additional storage of energy from the primary side to the secondary side. This energy is then transferred through the rectifying circuit diodes 1532, 1534 and is outputted to storage element 1538. Feedback block 1526 provides feedback back to the primary side 1502 and the control module 1510. In this embodiment, the feedback loop is from the secondary side 1504 to the primary side 1502. Alternatively, the diodes can be replaced with active devices. Alternatively, the rectifying circuit can be any combination of rectification schemes such as a single switch, half bridge, full bridge, or star. Alternatively, active components can be tied to node 1522 for additional clamping and control. Alternatively, feedback can consist of voltage, current, or the combination thereof.

Figure 15B:
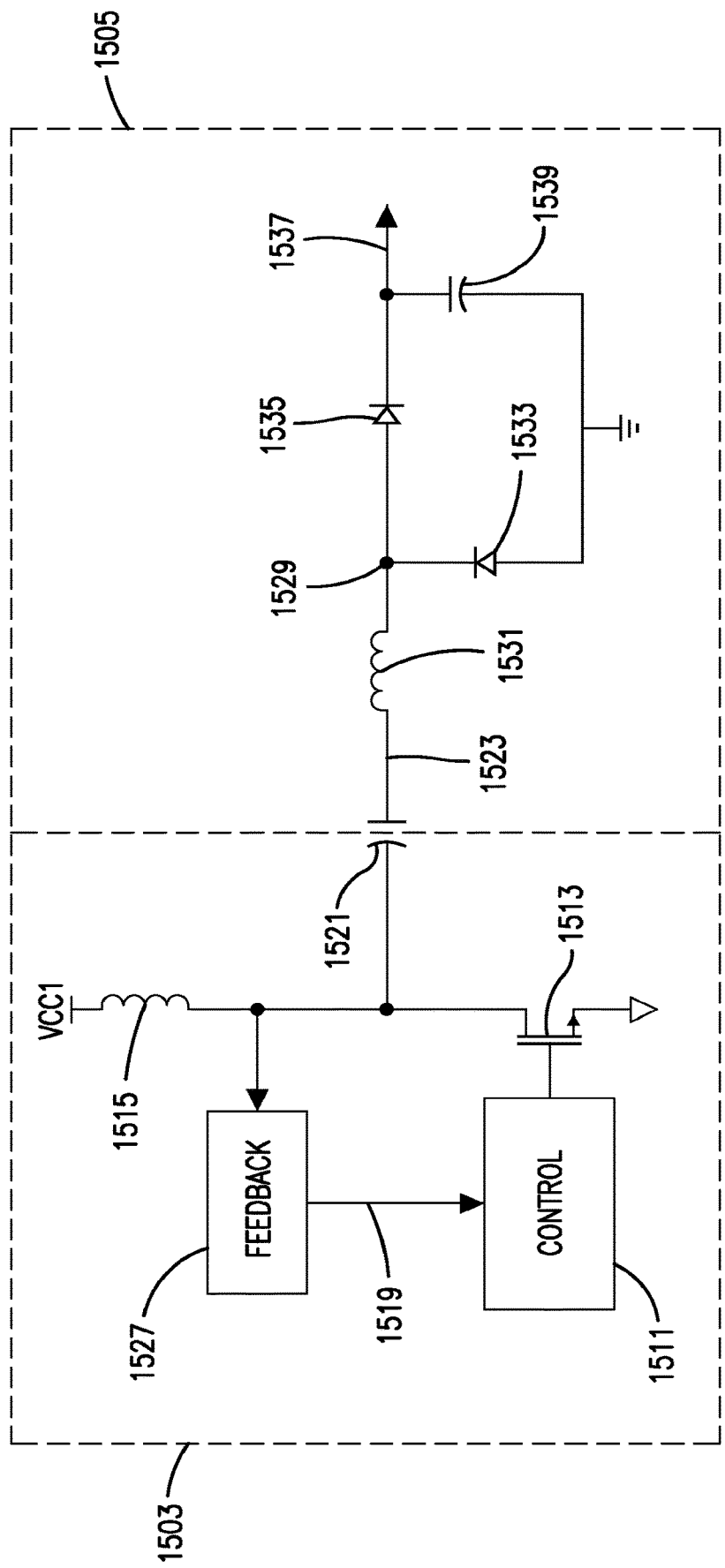
FIG. 15B is a diagram of another embodiment of the system configured to provide galvanic isolation of power using a resonant configuration and having feedback on the primary side.

In accordance with another embodiment of the present invention, FIG. 15B is a diagram of the system 1501 configured to provide galvanic isolation of power using a resonant configuration and having feedback between the galvanic interface. The system 1501 includes a primary side 1503 and a secondary side 1505. On the primary side 1503, the output of a Control block 1511 is connected to the gate of a primary side ground-referenced FET 1513. An input node 1519 of the Control block 1511 is connected to the output of a Feedback block 1527. The primary side ground-referenced FET 1513 is connected to a supply-referenced inductor 1515, the input of the Feedback block 1527, and a galvanic isolation capacitor 1521. The galvanic isolation capacitor 1521 is connected between the primary side 1503 and the secondary side 1505. On the secondary side 1505, the other node 1523 of the galvanic isolation capacitor 1521 is connected to a secondary side inductor 1531. The other node 1529 of the secondary side inductor 1531 is connected to the cathode of a first secondary side ground-connected diode 1533 and the anode of a second secondary side diode 1535. An output node 1537 is the cathode of the second secondary side diode 1535, and is connected to a ground-referenced capacitor 1539. FIG. 15B is similar to FIG. 15A, except that the feedback 1527 is on the primary side 1503. In this case the system 1501 provides open loop feedback to the secondary side 1505

Figure 15C:
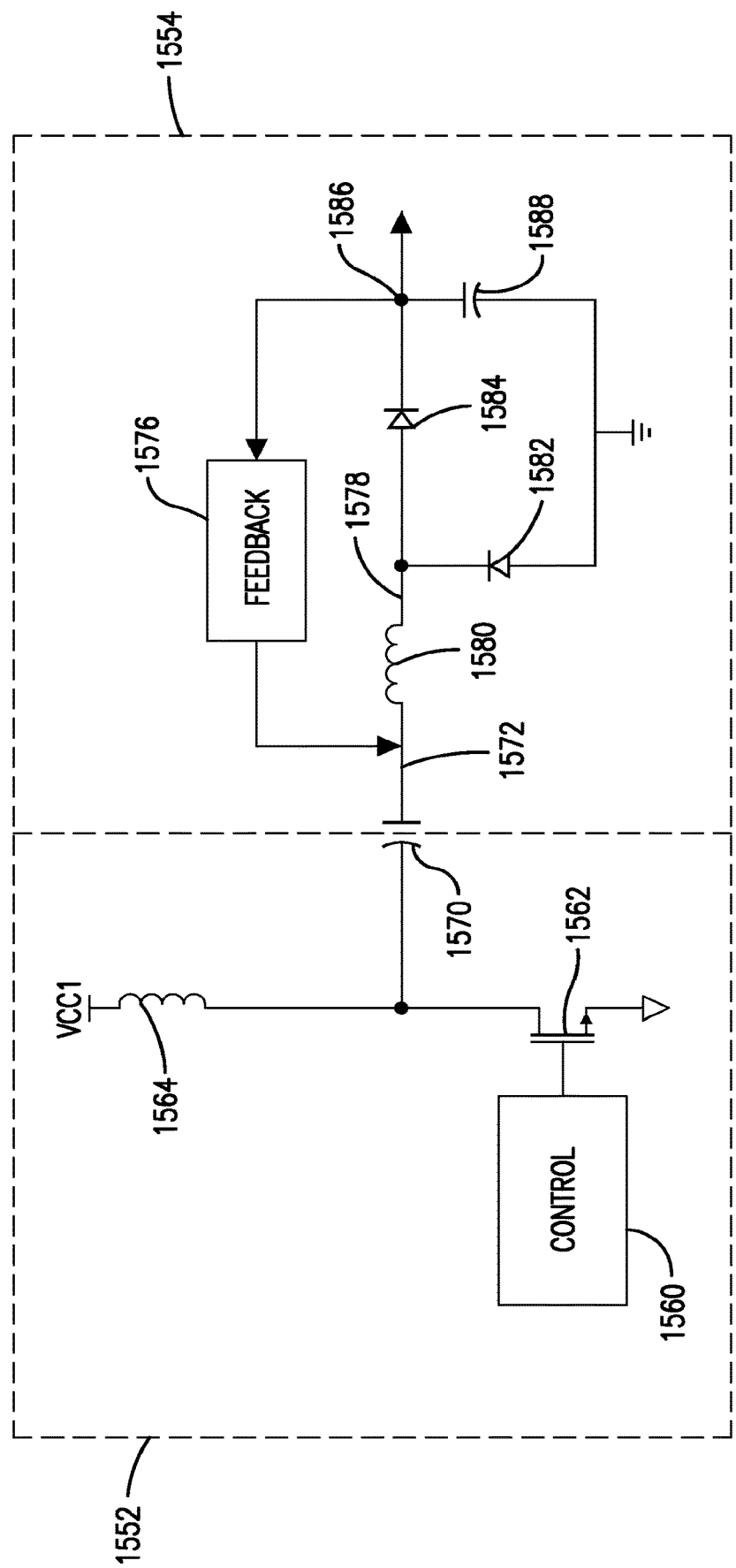
FIG. 15C is a diagram of another embodiment of the system configured to provide galvanic isolation of power using a resonant configuration and having feedback on the secondary side.

In accordance with another embodiment of the present invention, FIG. 15C is a diagram of the system 1550 configured to provide galvanic isolation of power using a resonant configuration and having feedback between the galvanic interface. The system 1550 includes a primary side 1552 and a secondary side 1554. On the primary side 1552, the output of a Control block 1560 is connected to the gate of a primary side ground-referenced FET 1562. The primary side ground-referenced FET 1552 is connected to a primary side supply-referenced inductor 1564 and a galvanic isolation capacitor 1570. The galvanic isolation capacitor 1570 is connected between the primary side 1552 and secondary side 1554. On the secondary side 1554, the other node 1572 of the galvanic isolation capacitor 1570 is connected to a secondary side inductor 1580 and the output of a Feedback block 1576. The other node 1578 of the secondary side inductor 1580 is connected to the cathode of a first secondary side ground-connected diode 1582 and the anode of second secondary side diode 1584. An output node 1586 is the cathode of the second secondary side diode 1584, and is connected to a secondary side ground-referenced capacitor 1588 and the input of the Feedback block 1576. FIG. 15C is similar to FIG. 15A, except that the feedback is only provided on the secondary side. In this case the system 1550 provides closed loop feedback to the secondary side 1554. Alternatively, feedback can be transferred through the galvanic isolated capacitor from the primary side to the secondary which would then provide feedback on both the primary side and secondary side. Alternatively, one or more feedback loops can be utilized in the system.

Figure 16:
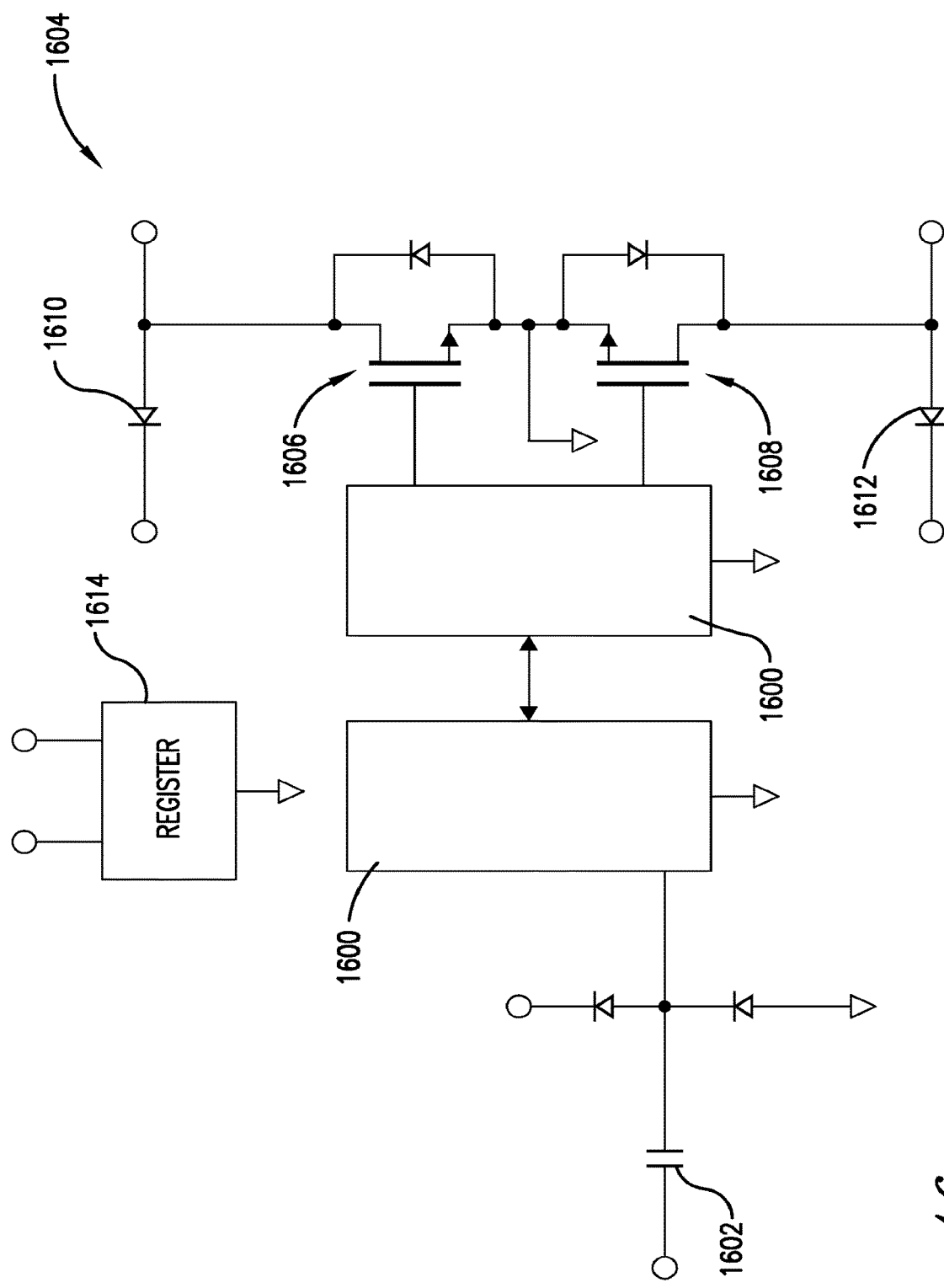
FIG. 16 is a diagram of an embodiment of a secondary side which is galvanically isolated from a primary side (not shown) and includes a secondary side control device.

In accordance with another embodiment of the present invention, FIG. 16 is a diagram of a secondary side Control device 1600. A galvanic isolation component 1602 connects the secondary side 1604 to a primary side (not shown). First and second FETs 1606, 1608 may be connected to the Control device 1600. A first diode 1610 may be connected to the first FET 1606, and a second diode 1612 may be connected to the second FET 1608. Power for the Control device 1600 may be provided as either AC or DC voltage through the first and second diodes 1610, 1612, especially when the first and second FET switches 1606, 1608 are in the "off" position. Alternatively, power through the first and second diodes 1610, 1612 may be provided to a regulator 1614 connected to the Control device 1600, or power for the regulator 1614 may be provided by the primary side via the galvanic isolation capacitor 1602. Alternatively, this power may be ported through magnetic isolation, or it could be provided via non-isolated means directly or through another passive or active device.

Figure 17:
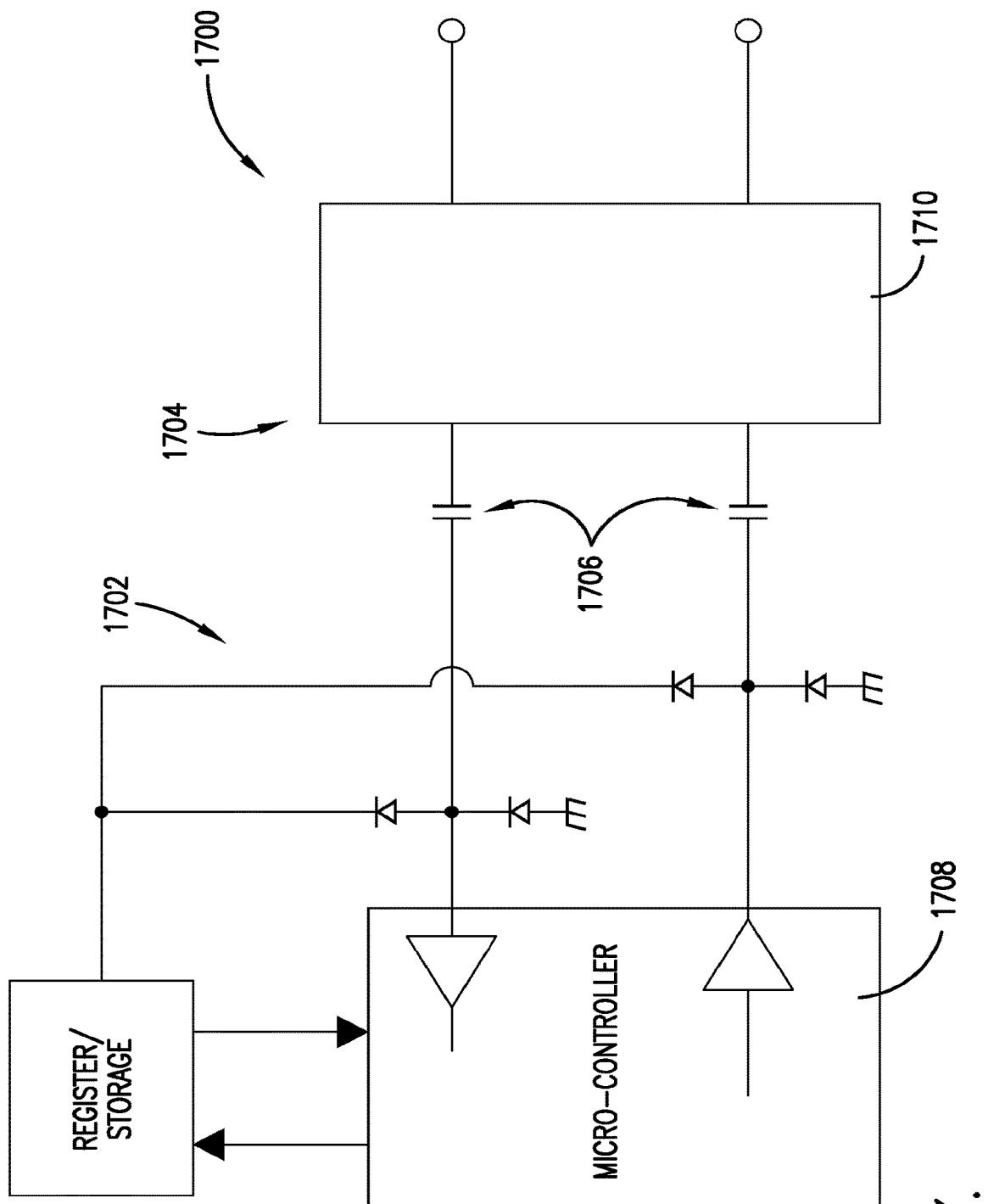
FIG. 17 is a diagram of an embodiment of a system having a primary side control device and a secondary side control device.

In accordance with another embodiment of the present invention, FIG. 17 is a diagram of a system 1700 including a primary side 1702, a secondary side 1704, and a galvanic isolation component 1706 connecting the primary and secondary sides 1702, 1704. The primary side 1702 includes a primary side Control device 1708, and the secondary side 1704 includes a secondary side Control device 1710. The secondary side Control device 1710 can receive power from the primary side 1702 to the secondary side 1704, or send power from the secondary side 1704 to the primary side 1702. In the case of power transferred from the primary side 1702 to the secondary side 1704, the galvanic interface 1706 may be used and toggled to provide power to a regulator (not shown) of the secondary side Control device 1710. The secondary side Control device 1710 may be used to determine how the switches can be turned "on" and "off" if power should be sent from the primary side 1702 to the secondary side 1704, if power should be sent from the secondary side 1704 to the primary side 1702, changes in parametrics such as oscillator frequency, placing the secondary side Control device 1710 into sleep mode, sending data from the secondary side 1704 to the primary side 1702, storing information in a non-volatile memory on the secondary side Control device 1710, and other functions. These functions can be achieved through one or more wire functions such as universal asynchronous receiver/transmitter (UART) or any other single or more wire protocol.

Additionally, an oscillator may be changed to a phased locked loop, in which case clocking would be controlled by the primary side 1702. Also, default conditions may be set on the secondary side Control device 1710 so that the oscillator will be in running mode in the startup state and the switches will be in the "off" state. This allows for the possibility that the secondary side 1704 provides power to the primary side 1702 so it can wake up and make appropriate decisions for the system 1700. Other scenarios for default conditions may provide a variety of functions for the secondary side Control device 1710 and the system 1700. The galvanic isolation component 1706 can be replaced with magnetic isolation or non-isolation through direct connection, passive, or active devices.

Figure 18:
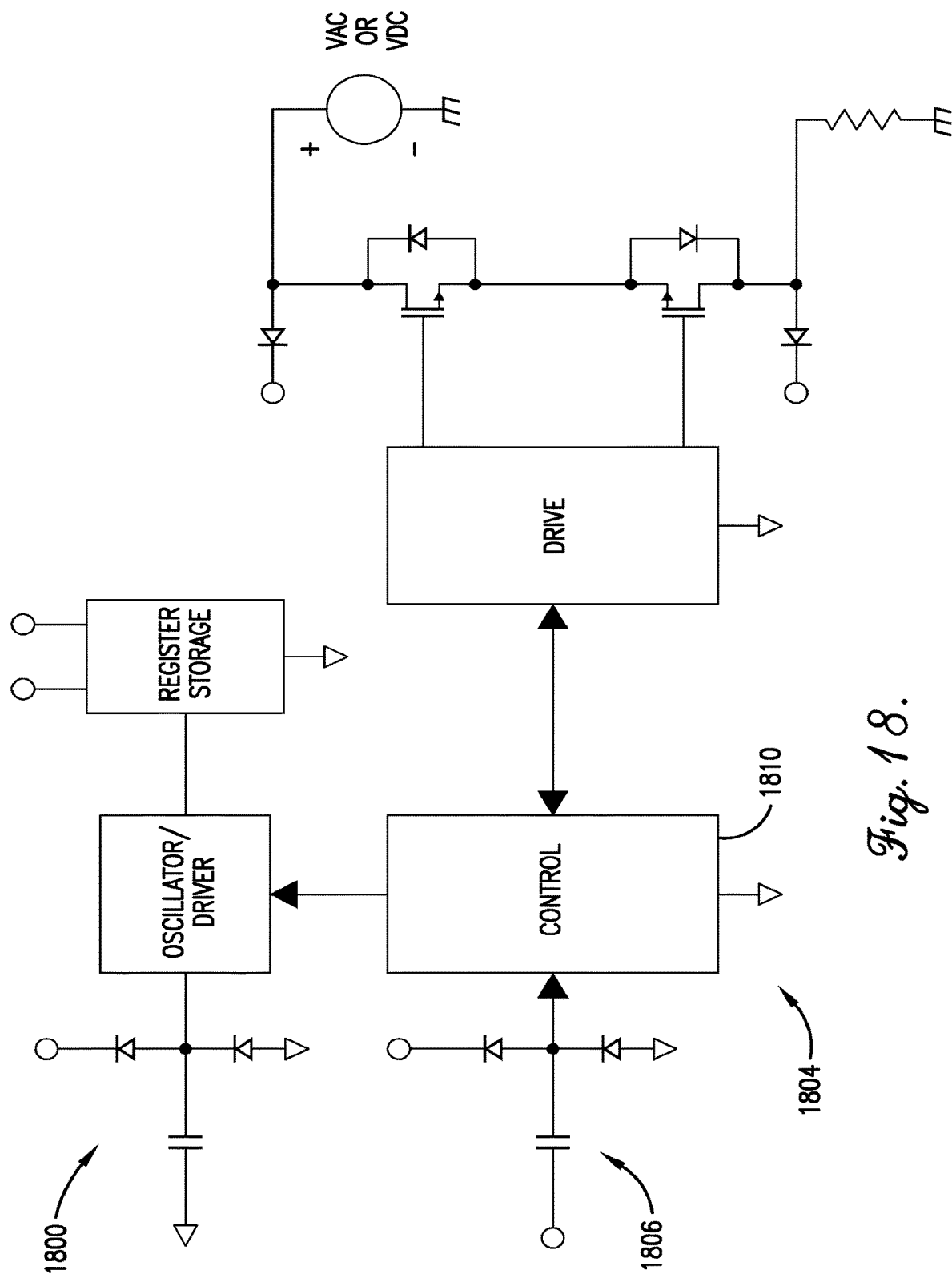
FIG. 18 is a diagram of an embodiment of a system having a secondary side control device.

In accordance with another embodiment of the present invention, FIG. 18 is a diagram of a system 1800 including a primary side (not shown), a secondary side 1804, and a galvanic isolation component 1806 connecting the primary side and the secondary side 1804. The secondary side 1804 includes a secondary side Control device 1810. The galvanic isolation link 1806 may be used to send power and/or data from the primary side to the secondary side 1804 or from the secondary side 1804 to the primary side. The charge may be directed through diode half-bridges which can store energy from the secondary side to the primary side. The galvanic isolation component 1806 may be replaced with magnetic isolation or non-isolation through direct connection, passive, or active devices. There may be more than two regions where data and/or power are transferred. Additionally, the oscillation frequency may be increased to values such that smaller and more cost effective passive devices can be used such as inductors, transformers, or capacitors.

Figure 19:
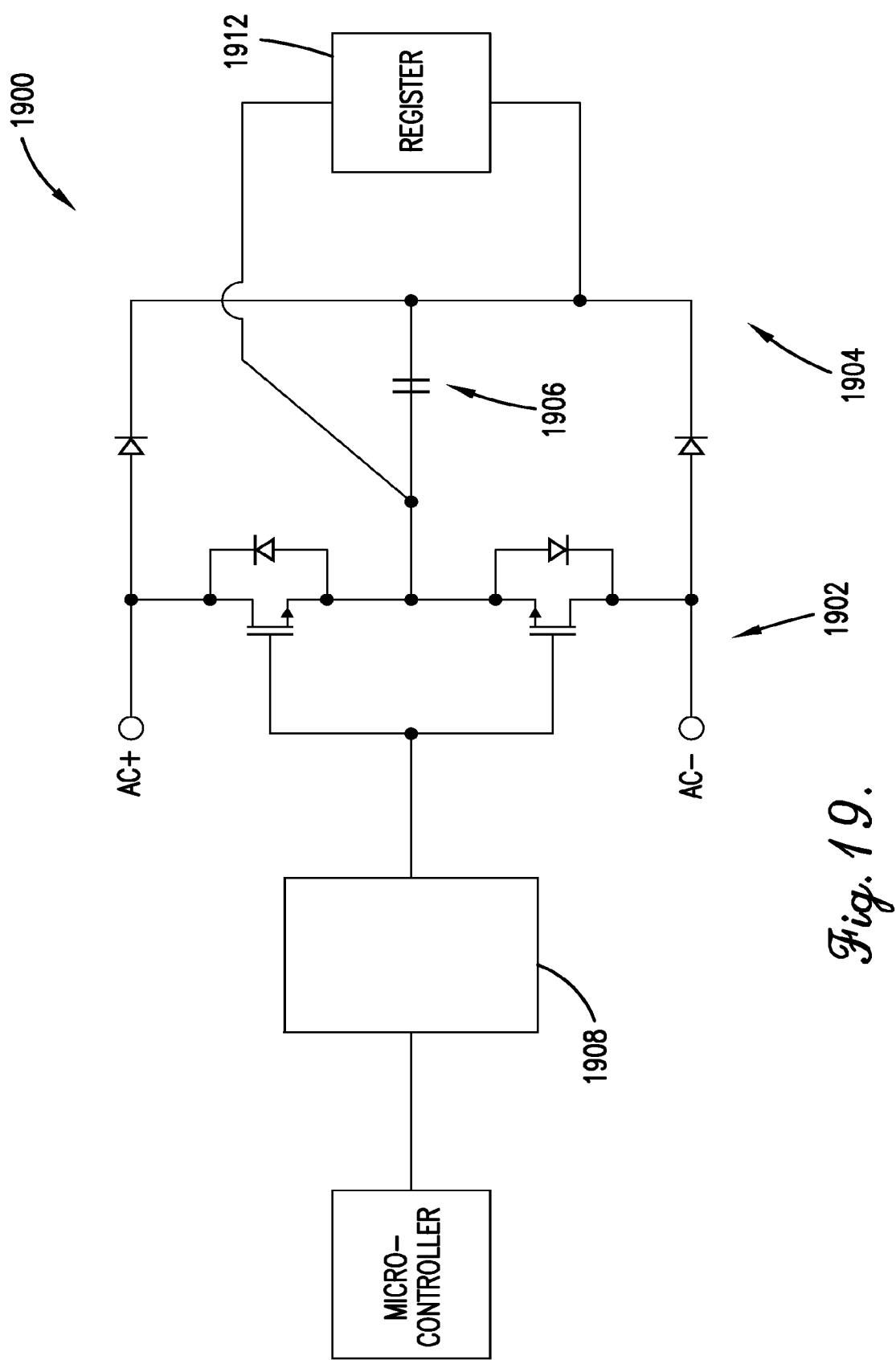
FIG. 19 is a diagram of an embodiment of a system having a primary side control device.

In accordance with another embodiment of the present invention, FIG. 19 is a diagram of a system 1900 including a primary side 1902, a secondary side 1904, and a galvanic isolation component 1906 connecting the primary side and the secondary side 1904. A primary side Control device 1908 may be isolated to control the secondary side 1904 or provide power. This galvanic isolation component 1906 may be capacitive or magnetic. Secondary side diodes may be used to provide power to the primary side 1902. A regulator 1912 may be used between the primary and the secondary sides 1902, 1904 to provide the correct voltage levels for the primary side Control device 1908. Additionally, the galvanic isolation component may also be used to transmit power and/or data between the primary side 1902 and the secondary side 1904.

Figure 20:
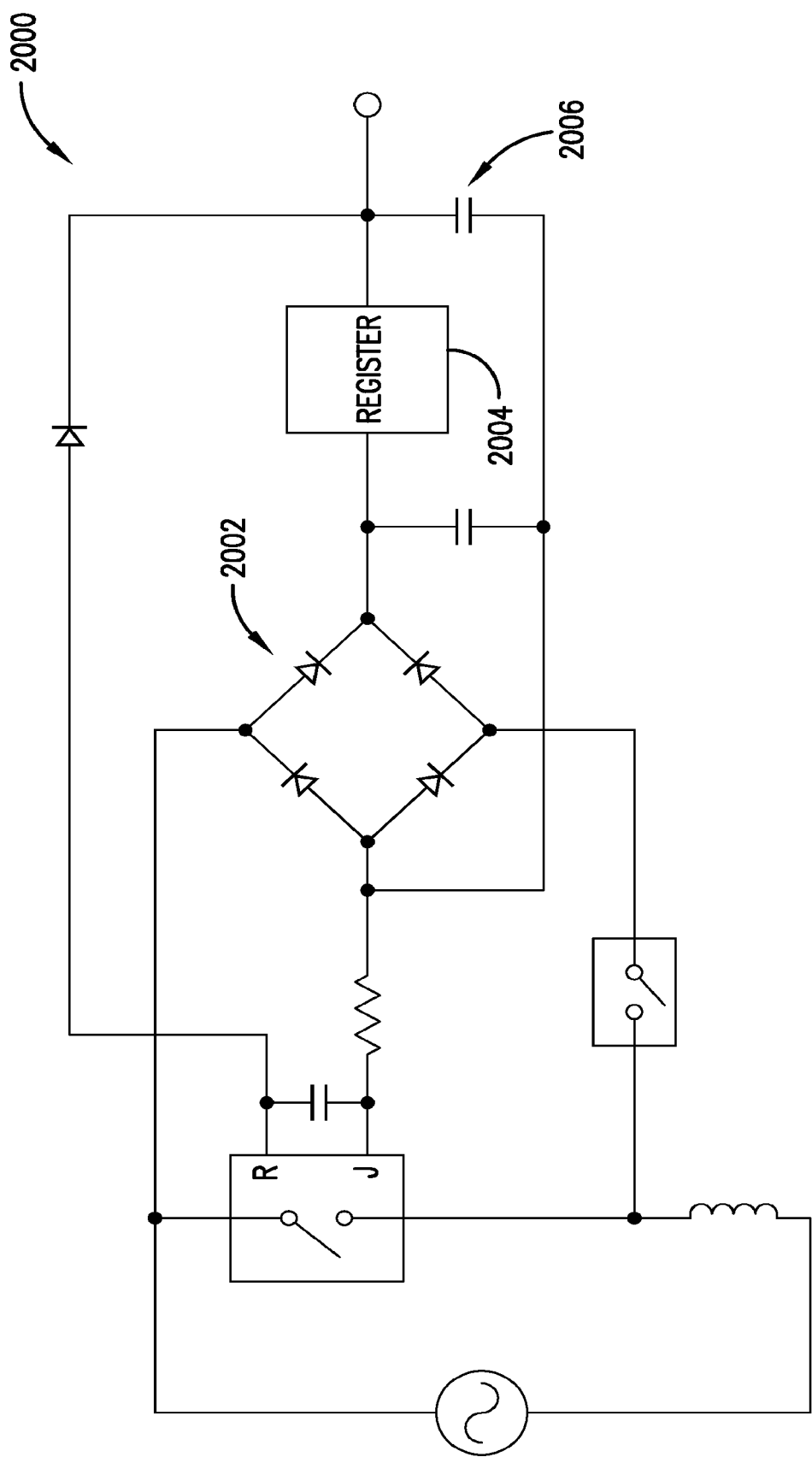
FIG. 20 is a diagram of an embodiment of a system having a rectifier.

In accordance with another embodiment of the present invention, FIG. 20 is a diagram of a system 2000 in which a rectifier 2002 is connected directly or through an impedance to a secondary side supply. This can allow the secondary side to have voltage available to rectify while also creating a connection to a primary side. Here again, a regulator 2004 may be used to create the correct voltage for the primary side. Capacitors 2006 may be used to help smooth transients and store energy. In all cases, regulation schemes can be accomplished by the use of linear regulation or switching regulation. These regulation schemes can also be configured as isolated or non-isolated regulators.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

Having thus described one or more embodiments of the invention, what is claimed as new and desired to be protected by Letters Patent includes the following:

1. A system comprising:
   two or more galvanic isolation components connected in series and connecting a primary side to a secondary side where electric current does not flow through the galvanic isolation components between the primary side and the secondary side;
   wherein the galvanic isolation components include a primary side node coupled to a field effect transistor and a primary side inductor and a secondary side node coupled to a secondary side storage element that is configured to generate a feedback data output to one of the galvanic isolation components.

2. The system of claim 1, wherein one or more of the galvanic isolation components is selected from the group consisting of: capacitors, magnetic coupling devices, inductors, transformers, and optical coupling devices, and is associated with a solar photovoltaic energy storage system.

3. The system of claim 1, wherein each galvanic isolation component independently connects the primary side to the secondary side and is used to select between a data mode and a power mode.

4. The system of claim 1, wherein a feedback block is connected between the secondary side storage element and the one of the galvanic isolation components which provides a feedback block differential data input signal and a control block which receives a feedback block output signal.

5. The system of claim 1, wherein one or more of the galvanic isolation components is selected from the group consisting of: capacitor, a magnetic coupling device, an inductor, a transformer, and an optical coupling device and are used to select one of two or more secondary side storage elements.

6. The system of claim 1, wherein one or more of the galvanic isolation components is selected from the group consisting of: a magnetic coupling device, an inductor, a transformer, and an optical coupling device and are used to select one of two or more secondary side storage elements, each associated with a photovoltaic energy system.

7. The system of claim 1, further comprising one or more rectifying circuit diodes connected to the secondary side storage element configured to provide differential data and differential power.

8. The system of claim 7, wherein the rectifying circuit can be at least one of a single switch, half bridge, full bridge, or star rectifier circuit and is configured to provide differential data.

9. The system of claim 8, wherein an active device is connected at the secondary side node between the galvanic isolation components and rectifying circuit, and at least one of the galvanic isolation components further comprises a series stack of a top plate metal node, a first passivation layer, a second passivation layer, a third passivation layer, a fourth passivation layer, a bottom plate node, and oxide layer, a first N diffusion layer, a first P diffusion layer, a second N diffusion layer and a second P diffusion layer.

10. The system of claim 7, further comprising at least one active device connected to the secondary side storage element configured to provide differential power.

11. The system of claim 7, wherein an active device is connected at the secondary side node between the galvanic isolation components and the storage element.

12. The system of claim 7 wherein the field effect transistor is configured to cause energy stored in the inductor to be boosted across the galvanic isolation components.

13. The system of claim 7, further comprising a rectifying circuit coupled to the secondary side storage element.

14. The system of claim 13 wherein the rectifying circuit comprises one or more diode.

15. The system of claim 14 wherein the rectifying circuit is coupled to the secondary side storage element.

16. The system of claim 7, wherein a rectifying circuit comprises one or more diodes in a one of a single switch, half bridge, full bridge, or star configuration.

17. The system of claim 1, further comprising at least one active device connected to the secondary side storage element and at least one diode.

18. The system of claim 1 wherein the field effect transistor is configured to boost stored energy.

* * * * *